United States Patent
Kadota

(10) Patent No.: US 8,427,669 B2
(45) Date of Patent: Apr. 23, 2013

(54) SCANNER CONTROL SYSTEM AND SCANNER DRIVER PROGRAM

(75) Inventor: Masatoshi Kadota, Takahama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1521 days.

(21) Appl. No.: 11/685,430

(22) Filed: Mar. 13, 2007

(65) Prior Publication Data

US 2007/0211310 A1    Sep. 13, 2007

(30) Foreign Application Priority Data

Mar. 13, 2006  (JP) ................................ 2006-067902

(51) Int. Cl.
G06F 3/12 (2006.01)
G06K 15/00 (2006.01)
H04N 1/04 (2006.01)
H04N 1/387 (2006.01)

(52) U.S. Cl.
USPC .......... 358/1.15; 358/1.16; 358/474; 358/450

(58) Field of Classification Search ................. 358/1.15, 358/474, 450
See application file for complete search history.

(56) References Cited

U.S. PATENT DOCUMENTS

| | | | | |
|---|---|---|---|---|
| 5,764,866 | A * | 6/1998 | Maniwa ........................ | 358/1.15 |
| 6,782,426 | B1 * | 8/2004 | Kuroshima et al. ........... | 709/229 |
| 7,002,702 | B1 * | 2/2006 | Machida ........................ | 358/1.15 |
| 7,293,114 | B2 * | 11/2007 | Yashiki et al. ................. | 710/5 |
| 7,334,219 | B2 * | 2/2008 | Cebula et al. ................. | 717/124 |
| 7,412,498 | B2 * | 8/2008 | Machida ........................ | 709/220 |
| 7,420,698 | B2 * | 9/2008 | Ferlitsch ........................ | 358/1.15 |
| 7,515,315 | B2 * | 4/2009 | Ferlitsch ........................ | 358/474 |
| 7,545,525 | B2 * | 6/2009 | Idehara ......................... | 358/1.15 |
| 7,593,983 | B2 * | 9/2009 | Machida ........................ | 709/203 |
| 7,600,227 | B2 * | 10/2009 | Brockway et al. ............ | 717/176 |
| 7,688,461 | B2 * | 3/2010 | Wise ............................. | 358/1.15 |
| 7,797,417 | B2 * | 9/2010 | Choi ............................. | 709/224 |
| 2005/0021795 | A1 * | 1/2005 | Kuroshima et al. .......... | 709/229 |
| 2005/0286080 | A1 * | 12/2005 | Lee et al. ....................... | 358/1.15 |
| 2007/0156705 | A1 * | 7/2007 | Tsuya ............................ | 707/10 |
| 2007/0216943 | A1 * | 9/2007 | Funamizu .................... | 358/1.15 |

FOREIGN PATENT DOCUMENTS

| | | |
|---|---|---|
| JP | 2002-209047 | 7/2002 |
| JP | 2003-174537 | 6/2003 |
| JP | 2003-219089 | 7/2003 |
| JP | 2003-244377 | 8/2003 |

(Continued)

OTHER PUBLICATIONS

Office Action received in counterpart Japanese Application No. 2006-067902, mailed on Mar. 16, 2010.

(Continued)

*Primary Examiner* — Twyler Haskins
*Assistant Examiner* — Jonathan Beckley
(74) *Attorney, Agent, or Firm* — Banner & Witcoff, Ltd.

(57) ABSTRACT

A scanner control system is described. The scanner control system includes a first communication interface which communicates with a first device group, a second communication interface which communicates with a second device group, the first device group and the second device group each containing a scanner, the second communication interface being different in specifications from the first communication interface, a storage device which stores scanner information on at least one scanner contained in the second device group, and a system main unit that transmits an instruction from an application unit to-the to a scanner driver unit and transmitting data from the scanner drive unit to the application unit.

13 Claims, 12 Drawing Sheets

FOREIGN PATENT DOCUMENTS

| | | |
|---|---|---|
| JP | 2004-201133 | 7/2004 |
| JP | 2005-175551 | 6/2005 |
| JP | 2005-175936 | 6/2005 |
| JP | 2005-184360 | 7/2005 |

OTHER PUBLICATIONS

"SANE—Introduction"; www.sane-project.org/intro.html; printed Apr. 20, 2007. pp. 1-2.

"SANE Scanner Access Now Easy"; www.sane-project.org/man/sane.7.html; printed Apr. 20, 2007. pp. 1-13.

"4.3 Operations"; www.sane-project.org/html/doc012.html; printed Apr. 20, 2007. pp. 1-8.

"SANE—Documentation" http://www.sane-project.org/docs.html; printed Apr. 10, 2007. pp. 1-2.

"SANE—Scanner Access Now Easy" http://www.sane-project.org; printed Apr. 20, 2007. pp. 1-2.

Notice of Reasons for Rejection in Japanese Patent Application No. 2006-067902 dated Oct. 12, 2010.

\* cited by examiner

FIG. 3A

[Support Model]

0x03,"M-7820N-N",[RELATED INFORMATION 1],[RELATED INFORMATION 2],....

0x01,"M-7820N",[RELATED INFORMATION 1],[RELATED INFORMATION 2],....

0x01,"D-8065DN",[RELATED INFORMATION 1],[RELATED INFORMATION 2],....

FIG. 3B

DEVICE=NET_NODE MODEL="M-7820N-N" NODENAME=BRN_487BDB ID=0x4f9:0x381

DEVICE=NET_8065DN_NODE MODEL="D-8065DN" NODENAME=BRN_430300 ID=0x4f9:0x1A4

DEVICE=NET_NODE2 MODEL="k" NODENAME=BRN_487BDB ID=0x4:0x1111

DEVICE=NET_8065DN_IP MODEL="D-8065DN" IP-ADDRESS=10.136.41.218 ID=0x4f9:0x1A4

SCANNER CONTROL SYSTEM AND SCANNER DRIVER PROGRAM

CROSS-REFERENCE TO THE RELATED APPLICATION(S)

This application is based upon and claims a priority from prior Japanese Patent Application No. 2006-067902 filed on Mar. 13, 2006, the entire contents of which are incorporated herein by reference.

TECHNICAL FIELD

Aspects of the present invention relate to a scanner control system which functions on an information processor capable of communicating with a scanner and to a scanner driver program for allowing the information processor to function as a scanner driver unit constituting a part of the scanner control system.

BACKGROUND

In general, a device based on specifications of a universal serial bus (USB) (hereinafter, referred to as a USB device) is provided with an identifier such as a vendor ID (VID) and a product ID (PID).

When the USB device is connected to an information processor such as a personal computer (PC), the VID and the PID can be transmitted from the USB device side to the information processor side. Thereby, the information processor side can recognize which function the connected USB device has, as disclosed in JP-A-2005-184360.

Therefore, the information processor can read into memory a program of a device driver necessary for controlling the USB device on the basis of the VID or the PID transmitted from the USB device, thereby allowing the device driver to function. Furthermore, when a single device driver corresponds to a plurality of models different in function and performance, the USB device is identified for function and performance on the basis of the PID. Thus, an appropriate control according to the identified function and performance can be realized.

SUMMARY

In an information processor on which a UNIX®-based operating system (OS) such as Linux® is installed, a scanner control system which is called a scanner-access-now-easy (SANE) is utilized. The SANE is configured in such a way that a SANE system main unit providing an interface to each of an application side and a user is allowed to function in collaboration with a scanner driver unit which controls a scanner. The SANE system main unit includes a frontend unit which provides a user interface function for displaying information obtained from the scanner driver unit and transmitting the information according to operations input by a user to the scanner driver unit. Furthermore, as compared with the frontend unit, the above scanner driver unit is also called a backend unit.

The backend unit is newly provided and registered in the SANE. Thereby, the number of newly corresponding models is increased. In this instance, the newly registered backend unit is capable of transmitting a model to be operated and a function supported by the model to a SANE system main unit. When a plurality of scanners are connected to the SANE system main unit, the SANE system main unit is provided with a function of enumerating information on the model sent from the backend unit and allowing a user to select a model to be used. The SANE system main unit is also provided with a function of displaying a dialog for allowing a user to select the function on the basis of model information sent from the backend unit and allowing the user to establish the function. The SANE will not be described in detail in this specification, because the specifications and source code are disclosed on the web site http://www.sane-project.org/ of March 2006.

When a scanner-based device (for example, an image scanner having a single function or a multifunction device having other functions in addition to a scanning function, hereinafter, they are collectively called a scanner) are controlled in the above-described scanner control system, and when the scanner is based on USB specifications (hereinafter, this scanner is referred to as a USB scanner), a scanner driver unit obtains VID and PID for various USB devices, as described in the above. Thereby, a USB scanner corresponding to the scanner driver unit is detected based on the obtained VID and PID. Furthermore, when a single scanner driver unit corresponds to a plurality of models different in function and performance, the function and performance of individual USB scanners are identified based on the PID and VID. Thus, an appropriate control according to the identified function and performance can be realized.

However, when a communication interface between an information processor and a scanner is different in specifications from a communication interface with USB, the information processor is unable to obtain the VID and the PID from the scanner.

Specifically, some of the above described USB scanners include models having a communication interface function other than USB. A representative example of the communication interfaces are communication interfaces based on specifications of IEEE 802 series (IEEE802.3/IEEE802.3u/IEEE802.3ab etc.)

Hereinafter, the communication interface is referred to as a local area network (LAN) interface. An scanner having both USB interface and LAN interface is not only used as a USB scanner but also used as a scanner capable of communicating with an information processor via a LAN interface (hereinafter, referred to as a network scanner).

However, when the above-described scanner is used as a network scanner, an information processor is unable to obtain the above-described VID and PID via the network. This is due to a difference in specifications between the USB and IEEE 802 system. In principle, the VID and the PID are ID loaded so as to be used according to the USB specifications. On the contrary, no communication protocol for obtaining the VID and the PID are provided in the specifications of the IEEE 802 system. Therefore, such a problem is found that a scanner driver unit, which should be able to control a USB scanner, is unable to control the network scanner in the same manner as the USB scanner.

Aspects of the present invention provide, even in an environment that information necessary for specifying the function of a scanner can be obtained from a scanner with which an information processor can communicate via a first communication interface but cannot be obtained from a scanner with which it can communicate via a second communication interface, a scanner control system capable of similarly controlling either of the scanners as well as a scanner driver program which allows the information processor to function as a scanner driver unit constituting a part of the scanner control system.

According to an aspect of the invention, there is provided a scanner control system including: a first communication interface which communicates with a first device group; a second communication interface which communicates with a second device group, the second communication interface being different in specifications from the first communication interface; a storage device which stores scanner information on a scanner contained in the second device group; an application unit; a scanner driver unit which controls a scanner contained in a device group capable of communicating via the first communication interface or the second communication interface, and which receives image data transmitted from the scanner, the scanner driver unit including: a first scanner-information obtaining unit which communicates with the first device group via the first communication interface, thereby obtaining scanner information on a scanner contained in the first device group; a second scanner-information obtaining unit which obtains the scanner information stored in the storage device; a list providing unit which provides a list of scanners to be obtained for the scanner information by the first scanner-information obtaining unit and the second scanner-information obtaining unit; a controlled-object information obtaining unit which obtains controlled-object information under the condition that one of scanner from the list of scanners is selected as a scanner-to-be-controlled, thereby providing the controlled-object information which indicates the scanner-to-be-controlled from a system main unit; a judgment unit which judges whether the scanner-to-be-controlled is contained in the first device group or the second device group on the basis of the controlled-object information; a scanner control unit which controls the scanner-to-be-controlled by utilizing either the first communication interface or the second communication interface, according to a result judged by the judgment unit; an image data receiving unit which receives image data transmitted from the scanner-to-be-controlled; and an image data providing unit which provides image data received by the image data receiving unit, wherein the system main unit transmits an instruction from the application unit to the scanner driver unit, the system main unit receives at least one of the list provided by the list providing unit and the image data provided by the image data providing unit, and transmits at least one of the list and the image data to the application unit.

According to another aspect of the invention, there is provided a computer program product for enabling a computer to have a function of a scanner driver, including: software instructions for enabling the computer to perform predetermined operations; and a computer readable medium bearing the software instructions, wherein: the computer including: a first communication interface which communicates with a first device group including a scanner; a second communication interface which communicates with a second device group including a scanner, the second communication interface being different in specifications from the first communication interface; a storage device which stores scanner information on a scanner contained in the second device group; an application unit; a scanner driver unit; and a system main unit which transmits an instruction from the application unit to the scanner driver unit, the system main-unit receiving data from the scanner driver unit, and transmitting the data to the application unit; and the predetermined operations including: obtaining scanner information on a scanner contained in the first device group by communicating with the first device group via the first communication interface; obtaining the scanner information stored in the storage device; providing a list of scanners to be obtained for the scanner information by the obtaining of the scanner information on the scanner contained in the first device group and the obtaining of the scanner information stored in the storage device; obtaining controlled-object information under the condition that one scanner from the list of scanners is selected as a scanner-to-be-controlled, thereby providing the controlled-object information which indicates the scanner-to-be-controlled; judging whether the scanner-to-be-controlled is contained in the first device group or the second device group on the basis of the controlled-object information; controlling the scanner-to-be-controlled by utilizing either the first communication interface or the second communication interface, according to a result of the judging; receiving image data sent from the scanner-to-be-controlled; and providing image data received by the receiving of the image data unit to the system main unit.

According to another aspect of the invention, there is provided a scanner control system including: a first communication interface which communicates with a first device group; a second communication interface which communicates with a second device group, the second communication interface being different in specifications from the first communication interface; a storage device which stores scanner information on a scanner contained in the second device group; an application unit; a scanner driver unit which controls a scanner capable of communicating via the first communication interface or the second communication interface, and which receives image data transmitted from the scanner, the scanner driver unit including: a first scanner-information obtaining unit which communicates with the first device group via the first communication interface, thereby obtaining scanner information on a scanner contained in the first device group; a second scanner-information obtaining unit which reads out a scanner information stored in the same format as the information obtained by the first scanner-information obtaining unit from the storage device, and which obtains the scanner information stored in the storage device; a function information providing unit which provides function information corresponding to scanner information obtained by the first scanner-information obtaining unit or the second scanner-information obtaining unit; an operational parameter information obtaining unit which obtains operational parameter information under the condition that a operation condition of a scanner-to-be-controlled is set, thereby providing the operational parameter information which indicates the operation condition from a system main unit; a scanner control unit which transmit a command corresponding to the operational parameter obtained by the operational parameter information obtaining unit by using at least one of the first communication interface and the second communication interface, thereby controlling the scanner-to-be-controlled; an image data receiving unit which receives image data transmitted from the scanner-to-be-controlled; and an image data providing unit which provides image data received by the image data receiving unit, wherein the system main unit transmits an instruction from the application unit to the scanner driver unit, the system main unit receives at least one of the list provided by the list providing unit and the image data provided by the image data providing unit, and transmits at least one of the list and the image data to the application unit.

According to another aspect of the invention, there is provided a computer program product for enabling a computer to have a function of a scanner driver, including: software instructions for enabling the computer to perform predetermined operations; and a computer readable medium bearing the software instructions, wherein: the computer including: a first communication interface which communicates with a first device group including a scanner; a second communication interface which communicates with a second device group including a scanner, the second communication interface being different in specifications from the first communication interface; a storage device which stores scanner information on a scanner contained in the second device group; an application unit; a scanner driver unit; and a system main unit which transmits an instruction from the application unit to the scanner driver unit, the system main-unit receiving data from the scanner driver unit, and transmitting the data to the application unit; and the predetermined operations including: obtaining scanner information on a scanner contained in the first device group by communicating with the first device group via the first communication interface; reading out a scanner information stored in the same format as the information obtained by the obtaining from the storage device, and obtaining the scanner information stored in the storage device; providing function information corresponding to scanner information obtained by the obtaining of the scanner information of the scanner contained in the first device group or the obtaining of the scanner information stored in the storage device; obtaining operational parameter information under the condition that a operation condition of a scanner-to-be-controlled is set, thereby providing the operational parameter information which indicates the operation condition; transmitting a command corresponding to the operational parameter obtained by using at least one of the first communication interface and the second communication interface, thereby controlling the scanner-to-be-controlled; receiving image data sent from the scanner-to-be-controlled; and providing image data received by the receiving of the image data unit to the system main unit.

BRIEF DESCRIPTION OF THE DRAWINGS

These and other objects and advantages of the present invention will be more fully apparent from the following detailed description taken in conjunction with the accompanying drawings, in which:

FIG. 3A is an explanatory view showing a concrete example of information described in a model description file and extended model description files; and FIG. 3B is an explanatory view showing a concrete example of information described in a setup file;

DETAILED DESCRIPTION OF THE ILLUSTRATIVE ASPECTS

Figure 1:
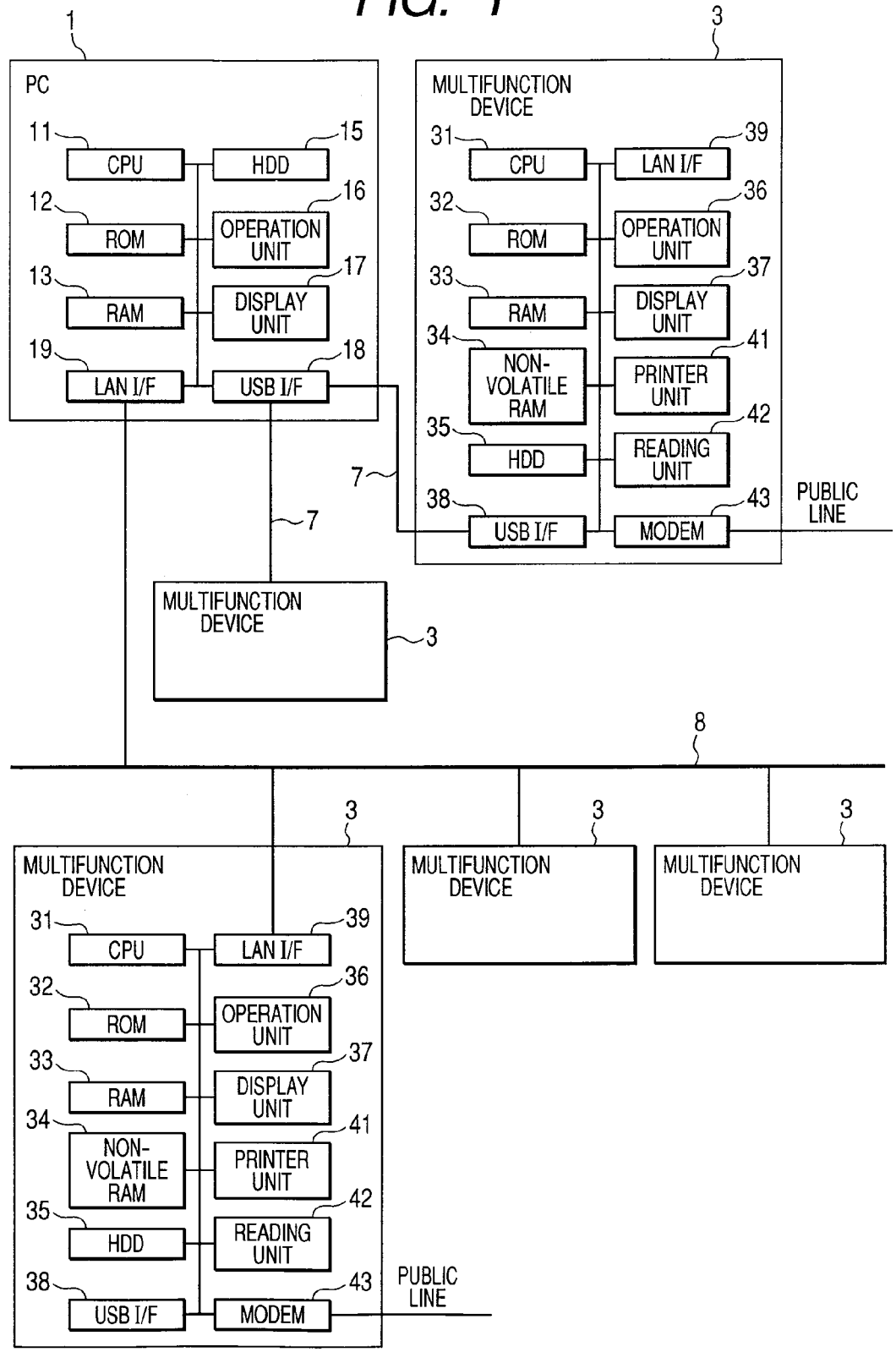
FIG. 1 is a block diagram illustrating a brief configuration of a personal computer and a multifunction device.

FIG. 1 is a block diagram illustrating a brief configuration of a personal computer 1 (PC 1) corresponding to one example of an information processor according to the present invention and a multifunction device 3 corresponding to one example of a scanner according to the present invention.

In one aspect of the present invention, the multifunction device 3 is a device which is used as a scanner in the processing to be described later and provided with functions to print, copy, fax and phone, in addition to the function of an image scanner. Furthermore, the multifunction device 3 can communicate with the PC 1 via a communication cable 7 based on USB specifications and also communicate with the PC 1 via a LAN 8 based on IEEE 802 system specifications. FIG. 1 shows a case where two sets of the multifunction device 3 are configured so as to communicate with the PC 1 via the communication cable 7 and three sets of the multifunction device 3 are configured so as to communicate with the PC 1 via the LAN 8, and these devices may be provided in any desired number.

As shown in FIG. 1, the PC 1 is provided with hardware such as a CPU 11, a ROM 12, a RAM 13, a hard disk device 15 (HDD 15), an operation unit 16, a display unit 17, an USB interface 18 (USB I/F 18), a LAN interface 19 (LAN I/F 19), on which Linux® is installed as an operating system (OS) for controlling the hardware.

The CPU 11 is a device for having control over parts of the PC 1 and making various types of calculations in accordance with programs stored at the ROM 12 and the RAM 13. The CPU 11 executes the processing as an application unit, a system main unit and a scanner driver unit.

The ROM 12 is a storage device capable of retaining the memory content after the power supply of the PC 1 is switched off, storing a basic input output system (BIOS) and data etc., for reading which is usually not renewed.

The RAM 13 is a storage device used as a main memory and the like which are directly accessed by the CPU 11. This RAM 13 stores software such as an operating system (OS) and various applications read from a HDD 15 and also stores results of various calculations performed by the CPU 11 and data read from the HDD 15. When the CPU 11 executes the processing as an application unit, a system main unit and a scanner driver unit which will be described later, programs for allowing the CPU 11 to execute each of the processing (application program, front end program and scanner driver program) are read from the HDD 15 into the RAM 13. Then, the CPU 11 executes each of the processing according to the programs stored in the RAM 13.

The HDD 15 stores the OS, various application programs, various data files, the above-described application program, the frontend program and the scanner driver program.

The operation unit 16 is an input device for inputting various instructions made by a user and composed of a keyboard, various pointing devices (for example, a mouse) and others.

The display unit 17 is an output device for displaying various pieces of information to a user and composed of a liquid crystal display for displaying, for example, color images.

The USB I/F 18 is a serial interface based on USB specifications. The USB I/F 18 can be connected via a communication cable 7 with various devices (for example, a printer, a keyboard, a mouse, a scanner, a speaker, and other various storage devices). In one aspect, it is connected with a multifunction device 3.

The LAN I/F 19 is a communication interface based on IEEE 802 system specifications. The LAN I/F 19 can be connected via a LAN 8 with various devices (for example, a printer, a scanner and various storage devices). In one aspect, it is connected with the multifunction device 3.

Furthermore, in one aspect, the OS installed on the PC 1 is provided with a multi-task operation. The processing based on a plurality of types of software can be executed in parallel by the multi-task operation in a time-sharing manner. Thereby, an application unit, a system main unit and a scanner driver unit to be described later are allowed to function on the PC 1. Furthermore, various functions themselves provided by the OS such as the multi-task operation are publicly known, a detailed description of which will be omitted here. The following description will be made on the assumption that the PC 1 is provided with various functions provided by Linux®.

The multifunction device 3 is provided with a CPU 31, a ROM 32, a RAM 33, a non-volatile RAM 34, a hard disk device 35 (HDD 35), an operation unit 36, a display unit 37, an USB I/F 38, a LAN I/F 39, a printer unit 41, a reading unit 42, a modem 43 and others.

The CPU 31 is a device for controlling various units of a multifunction device 3 and making various calculations according to a control program stored in the ROM 32.

The ROM 32 is a storage device capable of retaining the storage content after the power supply of the multifunction device 3 is switched off, storing various data for reading out which is not renewed usually, in addition to the above control program. The ROM 32 stores VID (vendor ID) and PID (product ID). The VID indicates a manufacturer of the multifunction device 3, and The PID (product ID) indicates a model of the multifunction device 3.

The RAM 33 is a storage device used as a main memory and others which are directly accessed by the CPU 31, temporarily storing in the RAM 33 various data calculated in the course of processing by the CPU 31.

The non-volatile RAM 34 is a storage device storing data which should not be lost when the power supply is switched off, for example, setting of the multifunction device 3.

The HDD 35 is a device for storing relatively large image data such as images sent or received through facsimile function, images read by an image scanner function and an image printed by printer function.

The operation unit 36 is an input device which is manually operated by a user in giving instructions to the multifunction device 3.

The display unit 37 is a device composed of a small-sized liquid crystal display and able to display information on a setting status and others of the multifunction device 3.

The USB I/F 38 is a serial interface based on USB specifications. Data can be communicated with the PC 1 by using the USB I/F 38.

The LAN I/F 39 is a communication interface based on IEEE 802 system specifications, and data can be communicated with the PC 1 also by using the LAN I/F 39.

The printer unit 41 is a device capable of printing a sheet-form medium (for example, printing paper) and activated when print data is printed by printer function, images received by facsimile function are printed, images copied by copy function are printed and the like.

The reading unit 42 is a device capable of reading images from a document set on an automatic document feeder (not shown) or a document placed on a flat-bed contact glass and activated when images are read by image scanner function, images sent by facsimile function are read and the like.

The modem 43 is a device for converting digital data prepared by the multifunction device 3 to an audio signal to transmit it to a public line side or converting the audio signal received from the public line side to digital data so that the data can be processed by the multifunction device 3. The modem 43 is activated when images are sent or received by facsimile function.

Figure 2:
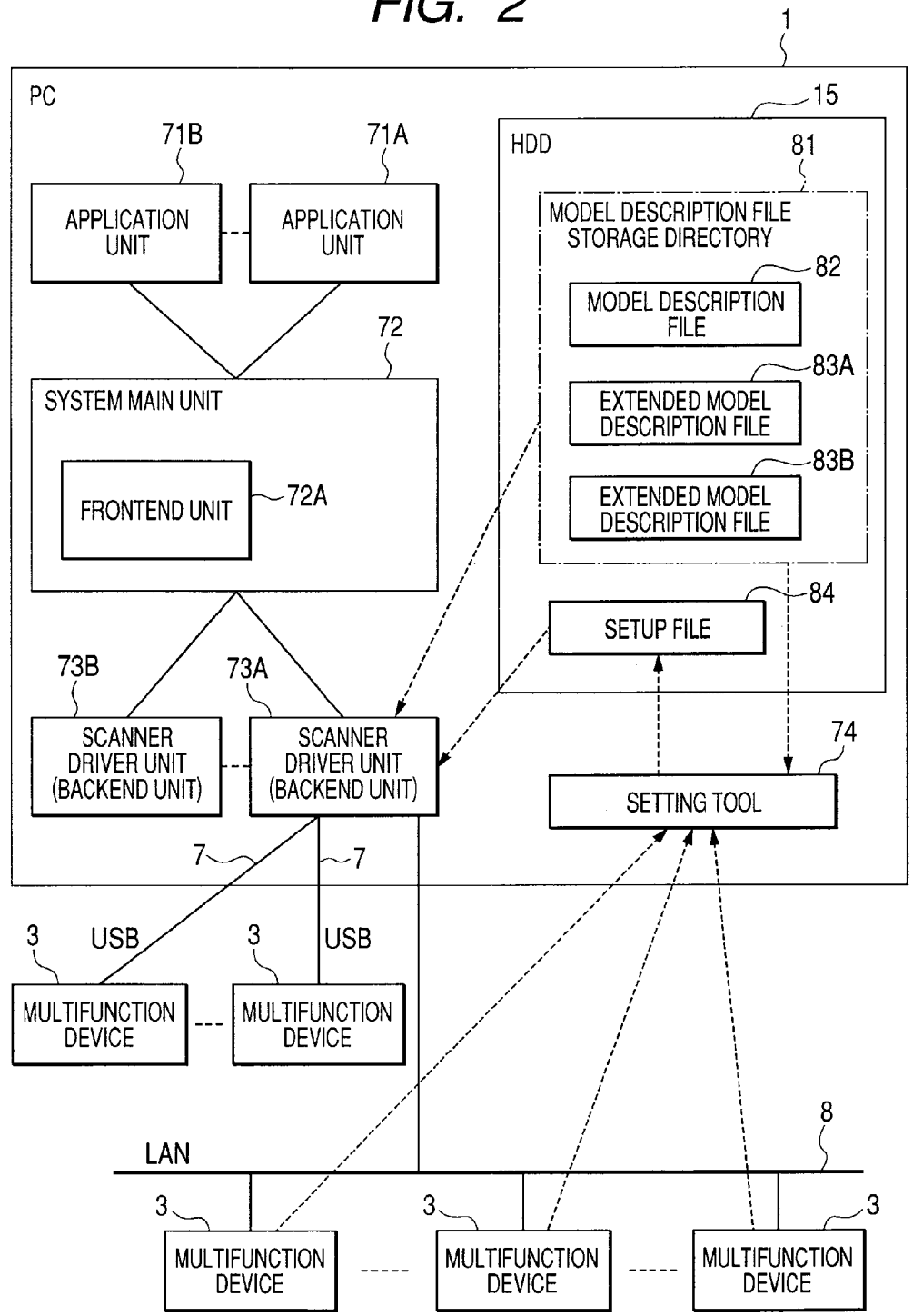
FIG. 2 is a block diagram illustrating a configuration of software and data provided in the personal computer.

A description will be made for a configuration of software provided in the PC 1 by referring to FIG. 2.

As described above, the CPU 11 provided by the PC 1 can execute in parallel the processing based on a plurality of software in a time-sharing manner. Thereby, application units 71A and 71B, a system main unit 72, scanner driver units 73A and 73B, a setting tool 74 and others shown in FIG. 2 are allowed to function on the PC 1.

The application units 71A and 71B are configured with software, having the function to input image data transmitted from a scanner. The scanner is related to multifunction devices 3 and 5 in one aspect. Although two application units 71A and 71B are shown in FIG. 2, application units functioning on the PC 1 may be provided in any given number.

The system main unit 72 is equivalent to a part of the system called SANE in one aspect of the present invention. The system main unit 72 is provided with an application interface function for transmitting information according to instructions given from the application units 71A and 71B to scanner driver units 73A and 73B and also receiving image data sent from the scanner driver units 73A and 73B to transmit them to the application units 71A and 71B. Furthermore, the system main unit 72 is provided with a front end unit 72A having user interface functions for displaying information obtained from the scanner driver units 73A and 73B on a display unit 17 and also transmitting information according to an input operation by a user from an operation unit 16 to the scanner driver units 73A and 73B.

The scanner driver units 73A and 73B are units working as a backend unit of the SANE. A program for these scanner driver units 73A and 73B are independent from the system main unit 72.

The program is software by which the scanner driver units 73A and 73B are registered in the system main-unit 72 to construct a scanner control system (SANE system), together with the system main unit 72. Although FIG. 2 illustrates two scanner driver units 73A and 73B, the number of scanner driver units functioning on the PC 1 is not necessarily two. In one aspect, the scanner driver unit 73A and the scanner driver unit 73B are different in manufacturer of a scanner-to-be-controlled. Furthermore, in an aspect, the scanner driver unit 73A is configured in such a way as to control a plurality of scanners made by the same manufacturer. However, in the case where scanners of the same manufacturer are different in model, other scanner driver-units may be needed for every model. Specifically, the number of scanner driver units functioning on the PC 1 is decided according to a manufacturer or a scanner model, the use of which is desired on the PC 1.

The setting tool 74 is software used in allowing the multifunction device 3 capable of communicating via the LAN 8 to be recognized at the scanner driver unit 73A, with the detailed function described later.

A description will be made for a configuration of data provided in the PC 1 by referring to FIG. 2.

A model description file storage directory 81 is prepared in the HDD 15 provided in the PC 1, and a model description file 82 is stored into the model description file storage directory 81. Information on standard-supported models by the scanner driver unit 73A is stored into the model description file 82. Furthermore, an extended model description file can be placed in the model description file storage directory 81. The extended file is to add later information on a model which is not yet confirmed at the time when the scanner driver is disclosed early, and provided separate from the above-described scanner driver. Here, a description will be given on the assumption that extended model description files 83A and 83B have already been added.

All of the model description file 82 and the extended model description files 83A and 83B are files describing information on models corresponding to the scanner driver unit 73A (models of the scanner which can be controlled by the scanner driver unit 73A). Models described in the model description file 82 are those to which the scanner driver unit 73A has corresponded from the beginning, whereas models described in the extended model description files 83A and 83B are equivalent to those to which the scanner driver unit 73A is later to additionally correspond.

Information to be described in the model description file 82 and the extended model description files 83A and 83B is information, the format of which is shown in FIG. 3A. Information on one-line described here represents a piece of information on one model to which the scanner driver unit 73A corresponds (information on 3 models in the case of information shown in FIG. 3A). Information on each line is configured by PID ("0x03" and others in FIG. 3A), a model name ("M-7820N-N" and others in FIG. 3A) and other related information groups (related information 1, related information 2, etc., in FIG. 3A).

Furthermore, a setup file 84 is stored in the HDD 15. Written into the setup file 84 is information which allows the multifunction device 3 capable of communicating via the LAN 8 to be recognized at the scanner driver unit 73A by the function of a setting tool 74. A method for using the information will be described later.

Information described inside the setup file 84 is information, the format of which is shown in FIG. 3B. Information on one line described here is information corresponding to one unit of multifunction device 3 capable of communicating via the LAN 8 (information on 4 units of multifunction device 3 capable of communicating via the LAN 8 in the case of information shown in FIG. 3B). Information on each line is configured by a scanner name given arbitrarily by a user ("NET_NODE" and others in FIG. 3B) a model name ("M-7820N-N" and others in FIG. 3B) a node name or IP address on the LAN 8 ("BRN 487BDB" and others in FIG. 3B), VID ("0x4f9" and others in FIG. 3B) and PID ("0x381" in FIG. 3B).

Furthermore, although a detailed description will be made later, when the PC 1 and the multifunction device 3 are connected via USB (in other words, via USB I/F 18, 38 and a communication cable 7), the PC 1 can obtain VID and PID stored in the ROM 32 of the multifunction device 3 from the multifunction device 3. The PC 1 side is, therefore, able to specify a manufacturer and a model of the multifunction device 3 on the basis of the VID and the PID obtained from the multifunction device 3.

On the contrary, when the PC 1 and the multifunction device 3 are connected via LAN (in other words, via the LAN I/F 19, 39 and the LAN 8), the PC 1 cannot obtain the VID or the PID stored in the ROM 32 of the multifunction device 3 from the multifunction device 3.

However, in one aspect, when the PC 1 and the multifunction device 3 are connected via LAN (in other words, via LAN I/F 19, 39 and the LAN 8), the PC 1 can obtain VID and PID stored in the setup file 84. Specifically, since the VID and the PID of the multifunction device 3 capable of communicating via the LAN are stored in a setup file 84, the PC 1 can obtain the VID and the PID stored in the setup file 84 and also able to specify a manufacturer and a model of the multifunction device 3 on the basis of the VID and the PID.

A description will be made for details of a scanner control system constructed with a system main unit 72 and a scanner driver unit 73A.

It is noted that in the following description a multifunction device 3 connected via USB (in other words, via USB I/F 18, 38 and a communication cable 7) is called "USB scanner" in order to clarify a connection form of the multifunction device 3. Furthermore, a multifunction device 3 connected via LAN (in other words, via LAN I/F 19, 39 and LAN 8) is called "network scanner." Still furthermore, the USB scanner and the network scanner are collectively called "scanner" in a simple manner.

Figure 5:
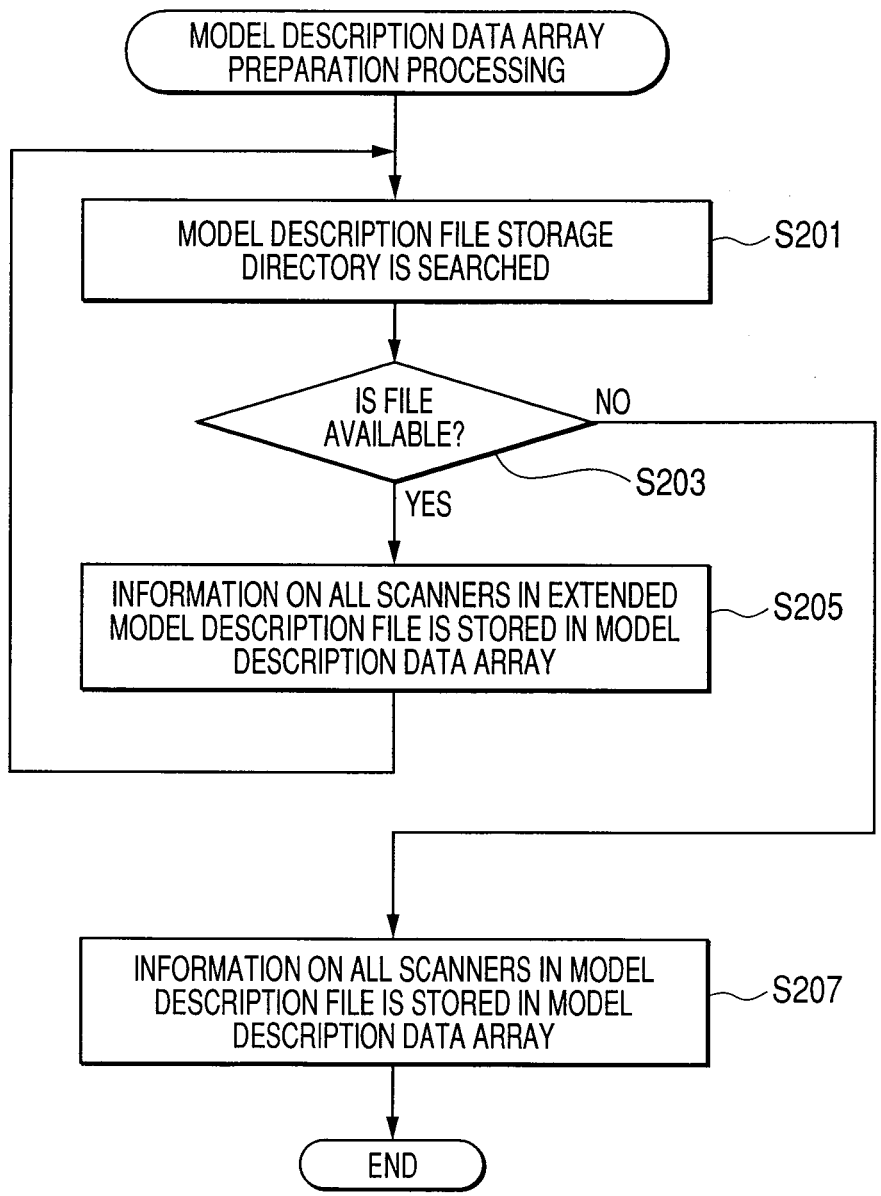
FIG. 5 is a flowchart of model description data array preparing processing.
Figure 6:
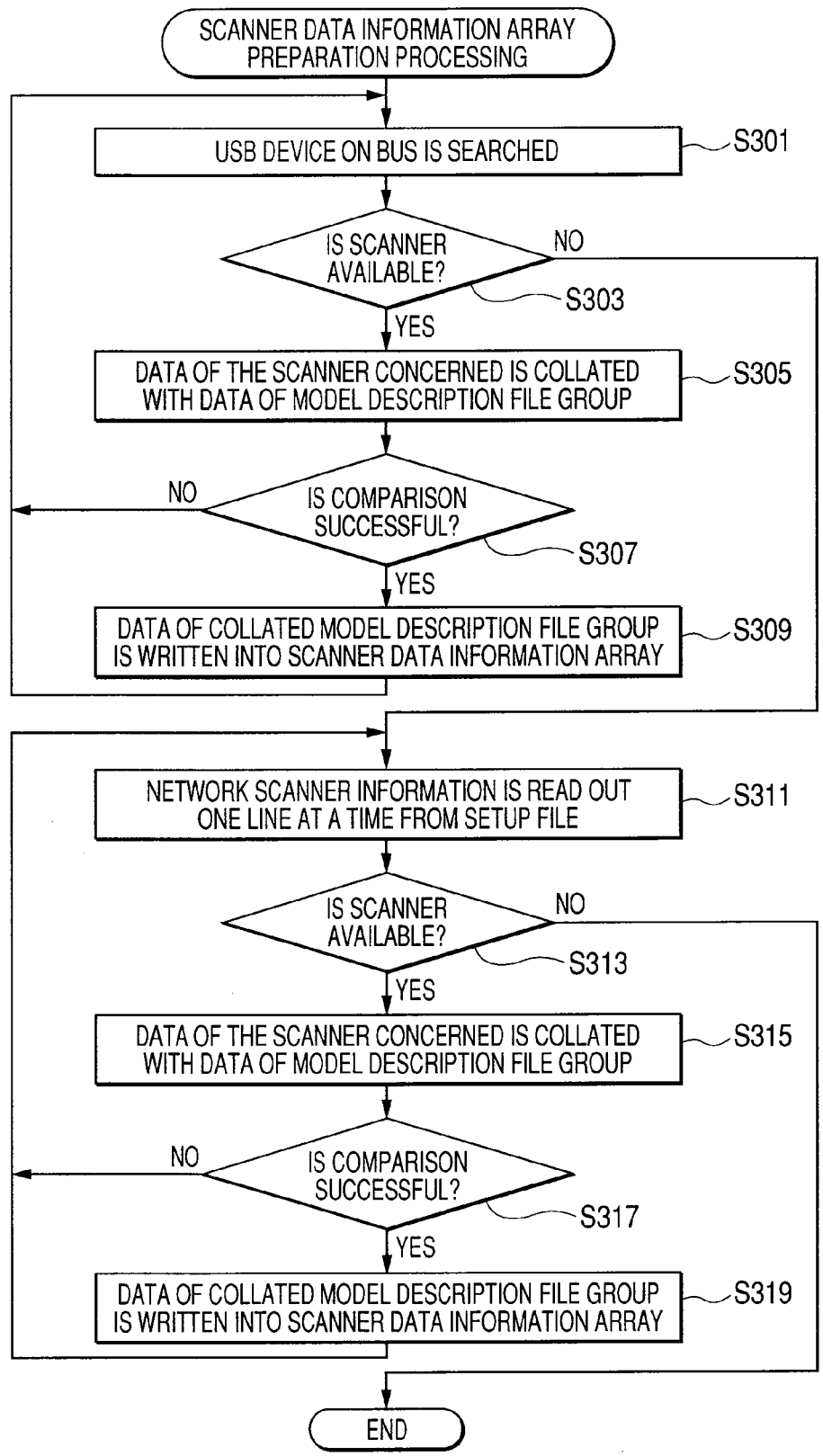
FIG. 6 is a flowchart of scanner data information array preparing processing.

First, a description will be made for a scanner list providing processing by referring to flowcharts given in FIG. 4 through FIG. 6. The scanner list providing processing is a processing which is executed by a scanner driver unit 73A when a system main unit 72 requires scanner driver units 73A and 73B to provide a list of available scanners.

Specifically, when a user operates so as to use a scanner, for example, in the course of processing executed by an application unit 71A, the application unit 71A will instruct the system main unit 72 to use the scanner according to the operation. Then, the system main unit 72 which has received the instructions from the application unit 71A requests all scanner driver units (scanner driver units 73A and 73B in the case shown in FIG. 2) to provide a list of available scanners. The scanner driver units 73A and 73B which have received this request will respectively carry out the processing in accordance with the request from the system main unit 72. Here, the processing executed by the scanner driver unit 73A is to be the scanner list providing processing which will be described hereinafter.

Upon starting the scanner list providing processing, the scanner driver unit 73A at fist executes model description data array preparing processing (S101). The model description data array preparing processing is processing for preparing array data which integrates information described in the model description file 82 and extended model description files 83A and 83B, the details of which are described in FIG. 5.

Specifically, when the model description data array preparing processing is started, the scanner driver unit 73A will search a model description file storage directory 81 (S201). When an unprocessed extended model description file is found as a result of the search, (S203: YES), all scanner information in the extended model description file is stored in a model description data array (S205). The model description data array is an array-type storage area allocated on a memory (RAM 13) by the scanner driver unit 73A.

Then, after the processing of S205 is completed, the operation returns to the processing of S201. Thereby, the processing from S201 to S205 will be repeated as long as an unprocessed extended model description file is found. Extended model description files 83A and 83B will be sequentially processed by the thus repeated processing.

Furthermore, when no extended model description file to be processed is found any longer as a result of the repeated processing (S203: NO), all scanner information in the model description file 82 is finally stored at the model description data array (S207), thereby completing the model description data array preparing processing. The model description data array prepared by the above-described processing is such that information inside the extended model description files 83A and 83B is at first stored into an array and information inside the model description file 82 is finally stored inside the array.

Figure 4:
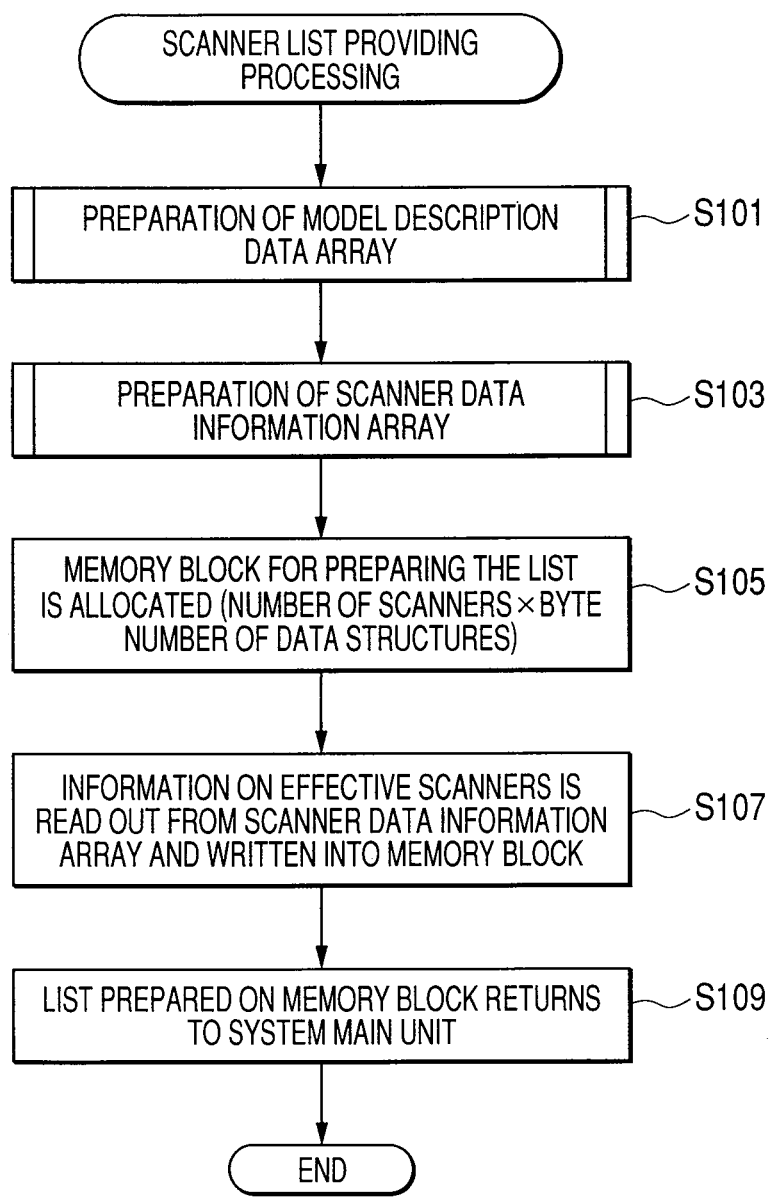
FIG. 4 is a flowchart of a scanner list providing processing.

Consequently, upon completion of the model description data array preparing processing, the processing of S101 shown in FIG. 4 is to be completed. Therefore, the scanner driver unit 73A will continue to execute the scanner data information array preparing processing (S103). The scanner data information array preparing processing is processing for preparing array data which integrates information on USB scanners detected by communications with a USB device and information on network scanners registered in the setup file 84, the details of which are shown in FIG. 6.

That is, when the scanner data information array preparing processing is started, the scanner driver unit 73A will search a USB device on a USB corresponding bus (S301). When the PC 1 is connected with various USB devices, the processing of S301 will result in detection of these various USB devices. Then, on the basis of VID and PID obtained from these detected USB devices, only USB scanners are extracted. When any USB scanner is found as a result of the search (S303: YES), data of the scanner is collated with data of a model description file group (the model description file 82 and extended model description file 83A and 83B) (S305).

Then, when the comparison can be made (S307: YES), it means that a USB scanner is found to which the scanner driver unit 73A corresponds. Thus, data of the thus collated model description file group is written into the scanner data information array (S309), and the operation returns to the processing of S301. It is noted that the scanner data information array is an array-type storage area allocated on a memory (RAM 13) by the scanner driver unit 73A.

On the contrary, when the comparison has failed (S307: NO), it means that there are no USB scanner to which the scanner driver unit 73A corresponds. Thus, the processing of S309 is skipped and the operation returns to the processing of S301.

Then, when the operation returns to the processing of S301, the processing from S301 to S309 will be repeated as long as a USB scanner detected on a bus is found. The USB scanner detected on the bus will be sequentially processed by the thus repeated processing.

When no USB scanner detected on the bus can be found any longer as a result of the repeated processing (S303: NO), the scanner driver unit 73A will read out network scanner information from the setup file 84 one line at a time (S311).

When network scanner information on one line can be read out by the processing of S311, it means that there is available one network scanner unit corresponding thereto (S311: YES). Thus, in this case, data of the scanner concerned is collated with data of a model description file group (a model description file 82 and extended model description files 83A and 83B) (S315).

When the comparison can be made (S317: YES), it means that a network scanner is found to which the scanner driver unit 73A corresponds. Data of the thus collated model description file group is written into the scanner data information array (S319), and an operation returns to the processing of S311.

On the contrary, when the comparison has failed (S317: NO), it means that there are no network scanner to which the scanner driver unit 73A corresponds. Thus, the processing of S319 is skipped and the operation returns to the processing of S311.

Then, when the operation returns to the processing of S311, the processing from S311 to S319 will be repeated as long as a network scanner registered in the setup file 84 is available. The network scanner registered in the setup file 84 will be sequentially processed by the thus repeated processing.

When no network scanner registered in the setup file 84 is available any longer as a result of the repeated processing (S313: NO), the scanner data information array preparing processing is completed.

After completion of the model description data array preparing processing, the processing of S103 shown in FIG. 4 is to be completed. Thus, the scanner driver unit 73A continuously allocates a memory block for preparing a list (S105). Here, the memory block for the scanner driver unit 73A is allocated inside a storage area which can be referenced from the system main unit 72, and the size of the memory block is decided by using the number of scanners and the number of bytes of a data structure corresponding to one scanner. The data structure corresponding to one scanner is determined in advance as the specifications of a system main unit 72 (specifications of SANE in the present aspect).

After the memory block is allocated, the scanner driver unit 73A reads out information on effective scanners from the scanner data information array and writes the information into the memory block (S107). Then, a list prepared on the memory block returns to the system main unit 72 (S109) to complete the scanner list providing processing. Furthermore, at the processing of S109, information is returned. The information is necessary in referencing on the system main unit 72 side to the memory block allocated at the processing of S105. For example, the information is related to leading address and size of the memory block. Further, it is acceptable that the information is information corresponding to the size, for example, final address of the memory block and the number of scanners.

As a result of the scanner list providing processing which is executed at the scanner driver unit 73A, a list of scanners which can be controlled by the scanner driver unit 73A is provided from the scanner driver unit 73A to the system main unit 72. Furthermore, although the scanner driver unit 73A is not necessarily the same in internal processing as the scanner driver unit 73B, a list of scanners which can be controlled by the scanner driver unit 73B is also provided from the scanner driver unit 73B to the system main unit 72.

Furthermore, since the system main unit 72 is provided with a publicly known SANE program, a detailed description on the internal processing will be omitted here. When a list of scanners is provided from the scanner driver units 73A and 73B and availability of a plurality of scanners is recognized by the list, the front end unit 72A provided by the system main unit 72 is in such a state that a device selecting dialog 91 shown in FIG. 7 is displayed on a display unit 17 to receive an input from a user.

A device display field 92, an OK button 93, a cancel button 94 and the like are provided inside the device selecting dialog 91. Information based on the list of scanners provided from the scanner driver units 73A and 73B as a list of usable scanners is integratedly displayed on the device display field 92.

Figure 7:
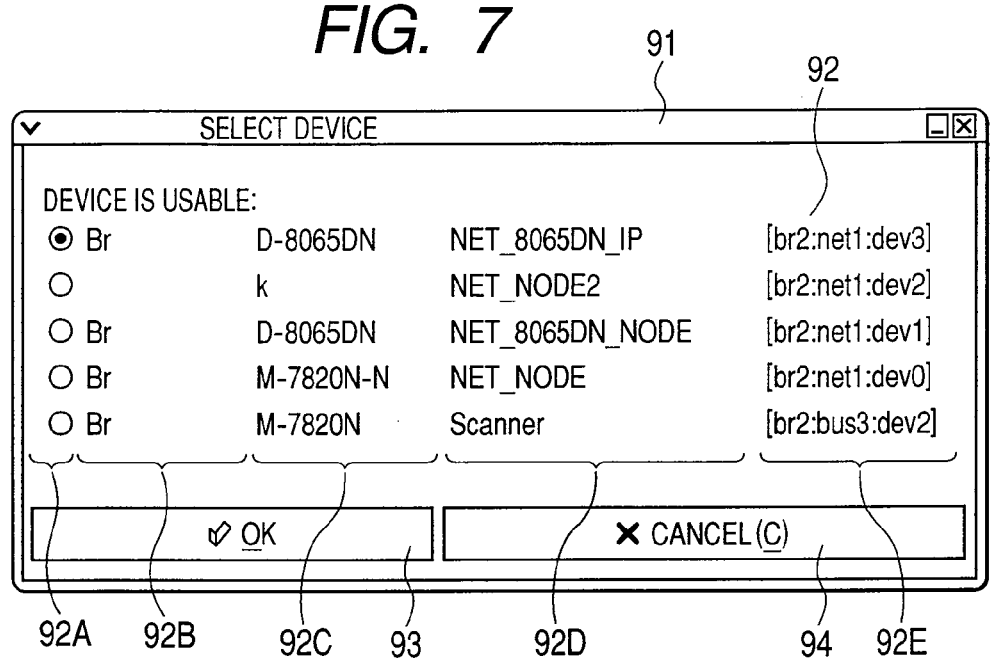
FIG. 7 is an explanatory view showing a device selecting dialog.

Specifically, in the case of the device selecting dialog 91 shown in FIG. 7, information on 5 scanner units is displayed on the device display field 92. Information on some of these units is based on the list of scanners provided from the scanner driver unit 73A and information on remaining units is based on the list of scanners provided from the scanner driver unit 73B.

Furthermore, the device display field 92 is provided with a radio button 92A for alternatively selecting one scanner unit, a manufacturer name display field 92B, a model name display field 92C, a scanner name display field 92D for displaying a name arbitrarily given to an individual scanner by a user, and an identification name display field 92E for displaying an identification name used for specifying an individual scanner on the PC 1.

A user refers to information displayed inside the device selecting dialog 91, selecting one desired scanner by using the radio button 92A at the operation unit 16 to carry out an operation of depressing the OK button 93 (an operation of clicking the OK button 93 by using a pointing device such as a mouse or that of depressing a short-cut key to which a function similar to the above operation is assigned). Thereby, instruction as to which scanner is desired to be used i.e. which scanner is desired to be a scanner-to-be-controlled is given to the system main unit 72 via the frontend unit 72A.

When it is recognized that only one scanner may be available with reference to the list of scanners, the above device selecting dialog 91 is not displayed but the scanner concerned is selected.

Figure 8:
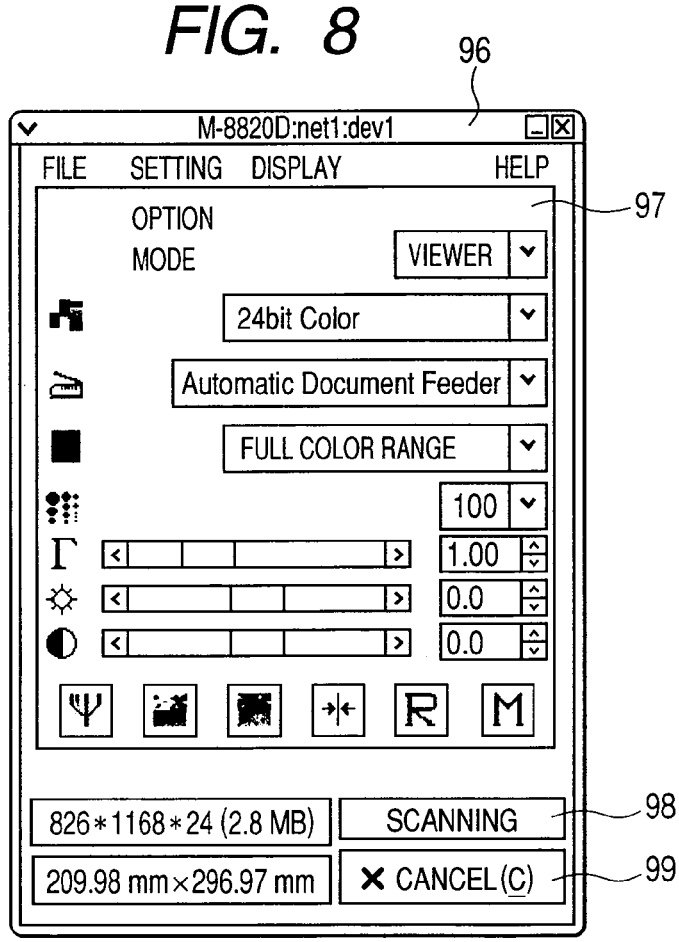
FIG. 8 is an explanatory view showing an option setting dialog.

The system main unit 72 which has been given the above instructions requests a scanner driver unit corresponding to a scanner-to-be-controlled which is designated by a user (for example, either the scanner driver unit 73A or 73B) to provide information on an option that can be set by the user about the thus selected scanner. Then, when information returns from the scanner driver unit in response to this request, the front end unit 72A provided in the system main unit 72 is in such a state that an option setting dialog 96 shown in FIG. 8 is displayed on a display unit 17 to receive an input from the user.

The option setting dialog 96 is provided therein with an option setting field 97, a scan button 98 and a cancel button 99. Here, a user refers to information displayed inside the option setting dialog 96 to set arbitrarily various options at an option setting field 97 through operations at the operation unit 16 and carry out an operation of depressing the scan button 98. Thereby, instruction to start a scanning operation is given to the system main unit 72 via the frontend unit 72A.

The processing on the system main unit 72 side described above or the processing in which the scanner driver unit provides information on options to the system main unit 72 side is a processing which is executed by a publicly known SANE program.

Figure 9:
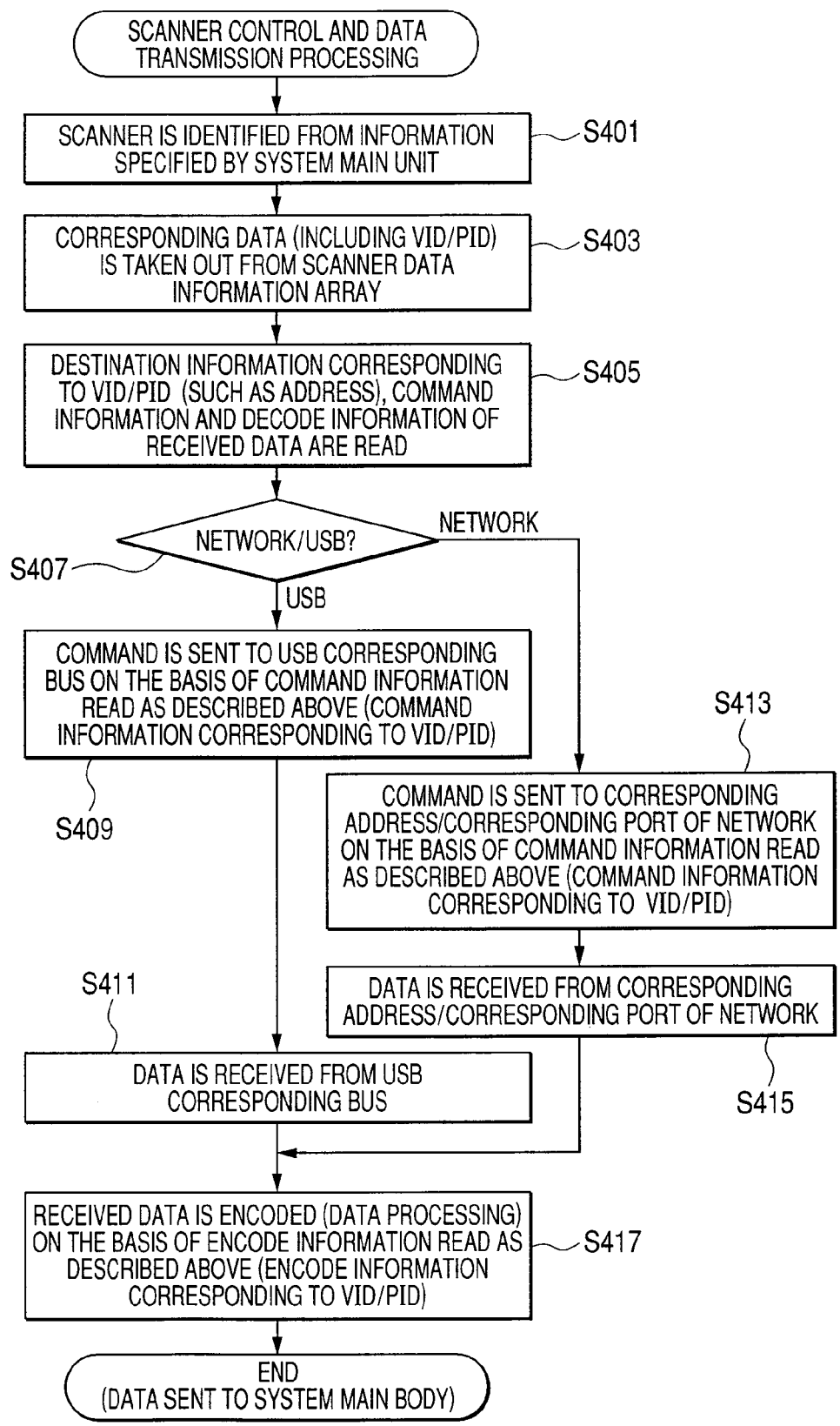
FIG. 9 is a flowchart of scanner control and data transmission processing.

Furthermore, the processing which provides information on options that can be set by a user for a scanner selected by the scanner driver concerned corresponds to the processing of S405 shown in FIG. 9. This processing will be described in detail later. On the basis of the information provided here, the system main unit 72 or a frontend unit 72A provided by the system main unit 72 decides an option for each item of the dialog concerned.

The processing to be executed when a scanner driver unit 73A is instructed by the system main unit 72 to start scanning is processing unique in the present aspect. Therefore, the processing will be described in detail with reference to the flowchart in FIG. 9. Furthermore, the processing is carried out by the SANE program which sequentially calls up subroutine programs provided by a scanner driver whenever necessary, which will be described as a series of processings for the sake of convenience.

When instructed by the system main unit 72 to start scanning, the scanner driver unit 73A at first specifies a scanner to control by referring to information designated by the system main unit 72 (S401). Since the information designated by the system main unit 72 includes controlled-object information indicating a scanner-to-be-controlled (a scanner selected by a user by utilizing the user interface function of the system main unit 72), one scanner unit selected by the user is identified at the processing of S401.

After the scanner-to-be-controlled is specified, the scanner driver unit 73A then takes out corresponding data (including VID/PID) from a scanner data information array (S403). As described already, the scanner data information array includes information either on USB scanners detected on a USB bus or network scanners registered on a setup file 84, and this information includes VID and PID both in the USB and network scanners. Therefore, information containing the VID/PID can be taken out at the processing of S403.

After data has been taken out from the scanner data information array, the scanner driver unit 73A then reads destination information corresponding to the VID/PID (such as address), command information and decode information on received data (S405). Some pieces of the information are included in data taken out from the scanner data information array, and remaining pieces of the information are included in data previously prepared for utilization by the scanner driver unit 73A. Furthermore, the information is partially returned to the system main unit 72 as a function list of corresponding scanners. As described previously, the system main unit 72 displays the option setting dialog 96 shown in FIG. 8 on the basis of the function list, thereby allowing a user to set operational parameters of functions. That is, the user can set the operational parameters in a range determined to be settable on a screen shown in FIG. 8 by the system main unit 72, according to the function of corresponding scanners shown in the function list. Thereby, a possible setting of parameters by which a corresponding scanner cannot be activated is eliminated. Furthermore, the user can confirm a kind of function of the corresponding scanner by referring to the screen in FIG. 8. The thus set content is also returned to the scanner driver unit 73A.

In this instance, since various pieces of information can be taken out on the basis of the same VID/PID, irrespective of whether the scanner concerned is a USB scanner or a network scanner, the processing is carried out by using the same database or the same programs.

Then, a judgment is made for whether the scanner-to-be-controlled is a network scanner or a USB scanner (S407).

When the scanner concerned is a USB scanner (S407: USB), a decision is made for command information (command information corresponding to VID/PID) read at the processing of S405 and a scanner control command corresponding to the function selected by a user with reference to the front end screen, and the scanner control command is sent to a USB corresponding bus (S409). This command is received on the USB scanner side. As a result, the USB scanner executes processing for reading images from an object to be read. Then, image data read by the processing is sent from the USB scanner side to a scanner driver unit 73A, and the image data is received by the scanner driver unit 73A from the USB corresponding bus (S411).

On the contrary, when the scanner concerned is a network scanner (S407: network), a scanner control command is sent to an address or a port corresponding to the network on the basis of the command information read by the processing of S405 (command information corresponding to VID/PID) (S413). This command is received on the network scanner side. As a result, the network scanner executes processing for reading images from an object to be read. Then, image data read by the processing is sent from the network scanner side to a scanner driver unit 73A, and the image data is received by the scanner driver unit 73A from the address or the port corresponding to the network (S415).

According to the above, after receipt of the image data by the processing of S411 or S415, the scanner driver unit 73A encodes the received data (data processing) on the basis of encode information read at the above processing of S405 (encode information corresponding to VID/PID) (S417). At the processing of S417, the image data is converted from a data format dependent on a scanner model-to-be-controlled to a data format in compliance with specifications of the system main unit 72.

Then, after completion of the processing of S417, the image data converted by the processing of S417 is given to the system main unit 72 to complete the processing shown in FIG. 9.

As a result of the above processing, the system main unit 72 side receives image data converted to a data format in compliance with specifications of the system main unit 72, thereby, the image data is to be transmitted to the application unit 71A side.

According to the above, according to a scanner control system composed of the system main unit 72 and the scanner driver unit 73A for executing the above scanner control processing (corresponding to one example of the scanner control system), communications via the LAN 8 are unable to obtain VID/PID from a network scanner (multifunction device 3) but able to obtain the VID/PID (corresponding to one example of the second scanner information) from the setup file 84 without carrying out communications with a network scanner to give them to the system main unit 72. Therefore, the system main unit 72 can handle both the USB scanner and the network scanner exactly in the same manner.

In this instance, since various types of information can be taken out on the basis of the same VID/PID, irrespective of whether the scanner concerned is a USB scanner or a network scanner, the processing is carried out by using the same database or the same programs, thereby making it possible to simplify the device.

As a result, when the application unit 71A uses a scanner via the system main unit 72 and the scanner driver unit 73A, the application unit 71A is able to use not only a USB scanner (corresponding to one example of the scanner connected via a first communication interface) but also a network scanner (corresponding to one example of the scanner connected via a second communication interface). Therefore, the application unit 71A side can use a desired scanner, without consideration given to a difference in specifications of the communication interfaces.

Furthermore, the scanner driver unit 73A for executing the processing of S101 to S109 (corresponding to one example of a list providing unit) provides the system main unit 72 with a list including scanner names given arbitrarily by a user to an individual scanner. Therefore, the system main unit 72 can display the scanner names, by which the user can easily select a desired scanner, for example, even when a plurality of the same-type scanners are available.

Furthermore, the scanner driver unit 73A for executing the processing of S101 to S109 provides the system main unit 72 with a list including model names of scanners, by which the system main unit 72 can display the model names and a user can easily select a scanner model having a desired function.

Furthermore, the scanner driver unit 73A for executing the processing of S409 or S413 (corresponding to one example of a scanner control unit) transmits a command which is determined according to VID/PID (corresponding to one example of model information) to a scanner-to-be-controlled, thereby controlling the scanner-to-be-controlled.

Therefore, when scanners-to-be-controlled are different in model, an optimal command according to the respective models can be sent to the scanner-to-be-controlled.

Furthermore, the scanner driver unit 73A for executing the processing of S417 (corresponding to one example of an image data transmitting unit) transmits to the system main unit 72 image data received by the processing of S411 or S415 (corresponding to one example of an image data receiving unit), after a data format dependent on a model of the scanner-to-be-controlled is converted to a data format suitable for specifications of the system main unit 72 in accordance with VID/PID. Therefore, when a data format of image data sent from a scanner-to-be-controlled is different according to a model of the scanner-to-be-controlled, the system main unit 72 side can receive the image data, without consideration given to such difference.

Furthermore, a model description file 82 and extended model description files 83A and 83B are stored in the same model description file storage directory 81. The scanner driver unit 73A for executing the processing of S301 to S309 (corresponding to one example of a first scanner information obtaining unit) will handle as effective information the scanner information obtained when the VID/PID are those included in corresponding model information stored either in the model description file 82 or the extended model description files 83A and 83B, even on the judgment that a scanner is available at the processing of S303. Therefore, only the corresponding model stored either in the model description file 82 or the extended model description files 83A and 83B is a scanner to be processed at the scanner driver unit 73A, thereby making it possible to add the corresponding model in a simple and convenient manner by only addition of an extended model description file. Furthermore, on deletion of an extended model, the thus added extended model description file may be only deleted. In this instance, an original file (model description file) is kept completely as it is without any modification and a state before the extension is retained. Therefore, an original state can be returned without fail. Still furthermore, even if models are extended several times, only a model extended at any given time can be deleted.

Particularly, the model description file 82 and the extended model description files 83A and 83B are configured as the respective files, and these files are stored in the same model description file storage directory 81. Therefore, without rewriting the model description file 82 in itself, files corresponding to the extended model description files 83A and 83B are only added to the model description file storage directory 81, by which a corresponding model can be added in a simple and convenient manner.

A description will be made for details of a setting tool 74. In the above scanner control system, the setting tool 74 is prepared for the following reasons.

Specifically, in the above scanner control system, in order for the scanner driver unit 73A to handle a network scanner, it is necessary to register VID/PID in advance in a setup file 84. However, the VID/PID are pieces of information quite internal for users. It is, therefore, not easy for general users to search the VID/PID of the multifunction device 3 even when they desire to use the multifunction device 3 as a new network scanner. Thus, there is a problem that a user finds it extremely difficult to directly describe the VID/PID of the multifunction device 3 inside the setup file 84.

The setting tool 74 is a tool provided for solving the above problem. It is provided for the purpose of registering scanner information on a network scanner in the setup file 84 (one example of a scanner information storing unit) even when a user is not aware of a specific content of the scanner information necessary for identifying the network scanner (a scanner which can be communicated via a second network).

Specifically, the setting tool 74 is provided with a function of additionally registering information on a network scanner in the setup file 84, that of changing the information registered in the setup file 84, that of deleting the information registered in the setup file 84, that of diagnosing the network scanner registered in the setup file 84, and that of displaying information registered in the model description file 82, the extended model description files 83A and 83B and the setup file 84. Of these functions, a function to be actually used is specified by parameters described in a command line input from the operation unit 16 when a user activates the setting tool 74.

Hereinafter, a description will be made for the tool processing executed by the setting tool 74 with reference to flowcharts given in FIG. 10 to FIG. 13.

Upon start of the tool processing, at first, a judgment is made by the setting tool 74 on the basis of parameters designated in a command line for whether a user instructs to add scanner information (S501).

When it is judged at the processing of S501 that addition of the scanner information is instructed (S501: YES), scanner information addition processing is executed (S503). This scanner information addition processing is processing that is described in detail in FIG. 11.

When the scanner information addition processing is started, the setting tool 74 is kept in standby until a scanner name is input (S601). The scanner name input here may be an easily recognizable name set arbitrarily by a user. After the scanner name is input, the setting tool 74 collates the thus input scanner name with scanner names which have been registered in the setup file 84 (S603).

As a result of the processing of S603, when the comparison has failed (S605: NO), it means that the thus input scanner name is not registered in the setup file 84. In this case, the operation is kept in standby until a model name is input (S607). After the model name is input, the thus input model name is collated with a model information description file group (S609).

As a result of the processing of S609, when the comparison has failed (S611: NO), it means that the thus input model name is not a model corresponding to the scanner driver unit 73A. Therefore, the operation returns to the processing of S607, by which a user is allowed to input again the model name. Furthermore, in the course of repeating the processing of S607 to S611, when a user conducts a predetermined cancel operation in place of inputting the model name, the setting tool 74 instantly completes all processing. However, since the cancel operation is just a general processing provided often by this type of software, the operation is not shown in a flowchart.

On the contrary, as a result of the processing of S609, when the comparison has succeeded (S611: YES), the setting tool 74 is kept in standby until destination information (IP address or node name) is input (S613). Then, after the destination information is input, VID/PID are read out from a model information description file group (S615) and a scanner name, an address and the VID/PID are added to the setup file 84 (S617).

VID/PID added to the setup file 84 at the processing of S617 are the VID/PID read out at the processing of S615. The VID/PID correspond to a model name input at the processing of S607. Therefore, a user who is unaware of the VID/PID contained in a network scanner which is desired for addition to a setup file can register the VID/PID indicating the model in the setup file 84 by inputting the model name at the processing of S607 as long as the model name is known.

What has been so far described is processing that the comparison has failed as a result of the processing of S603. When the comparison has succeeded (S605: YES), the thus input scanner name has already been registered in the setup file 84. In this case, an error is displayed for avoiding registration under the same scanner name (S619).

Figure 10:
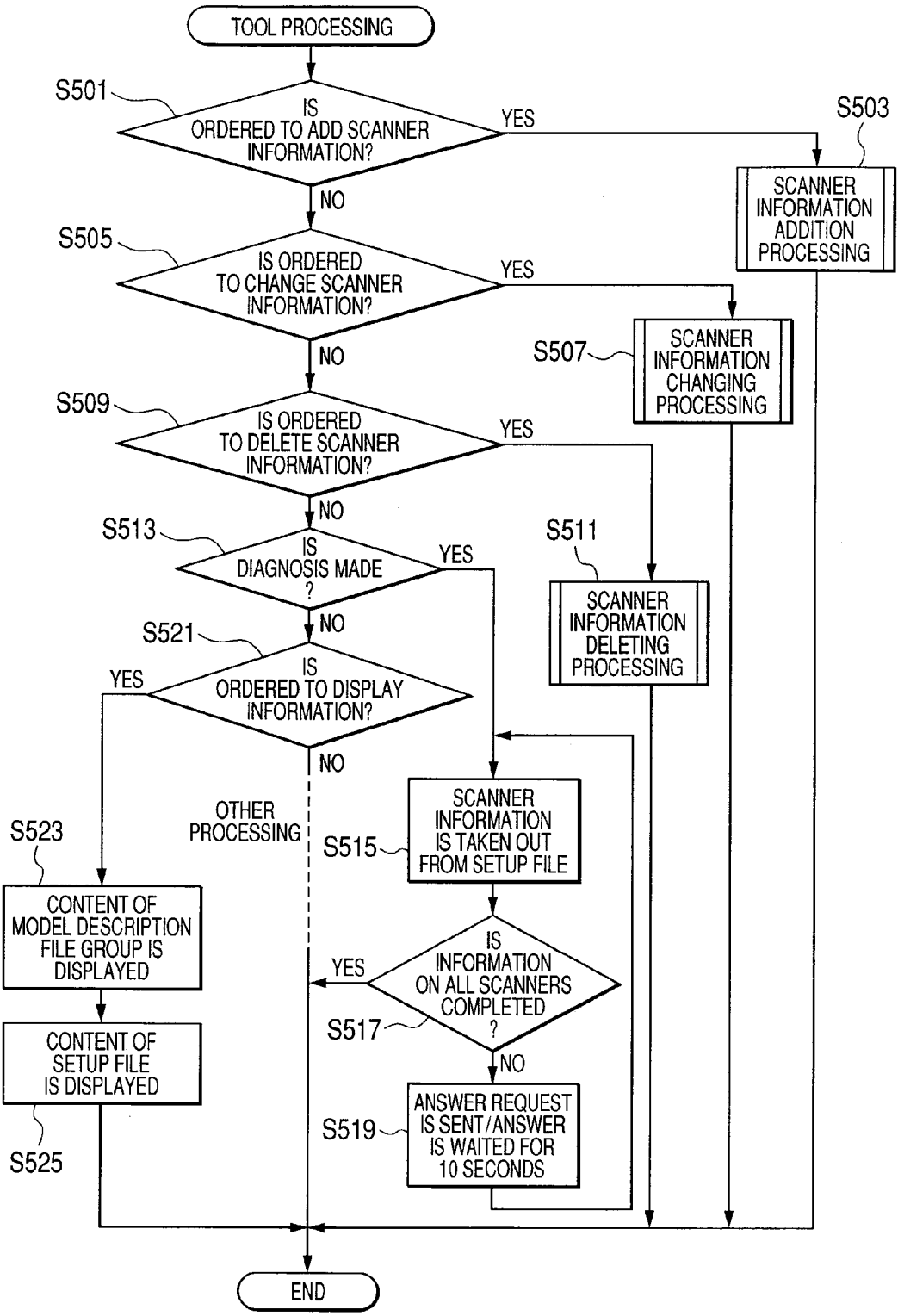
FIG. 10 is a flowchart of tool processing.
Figure 11:
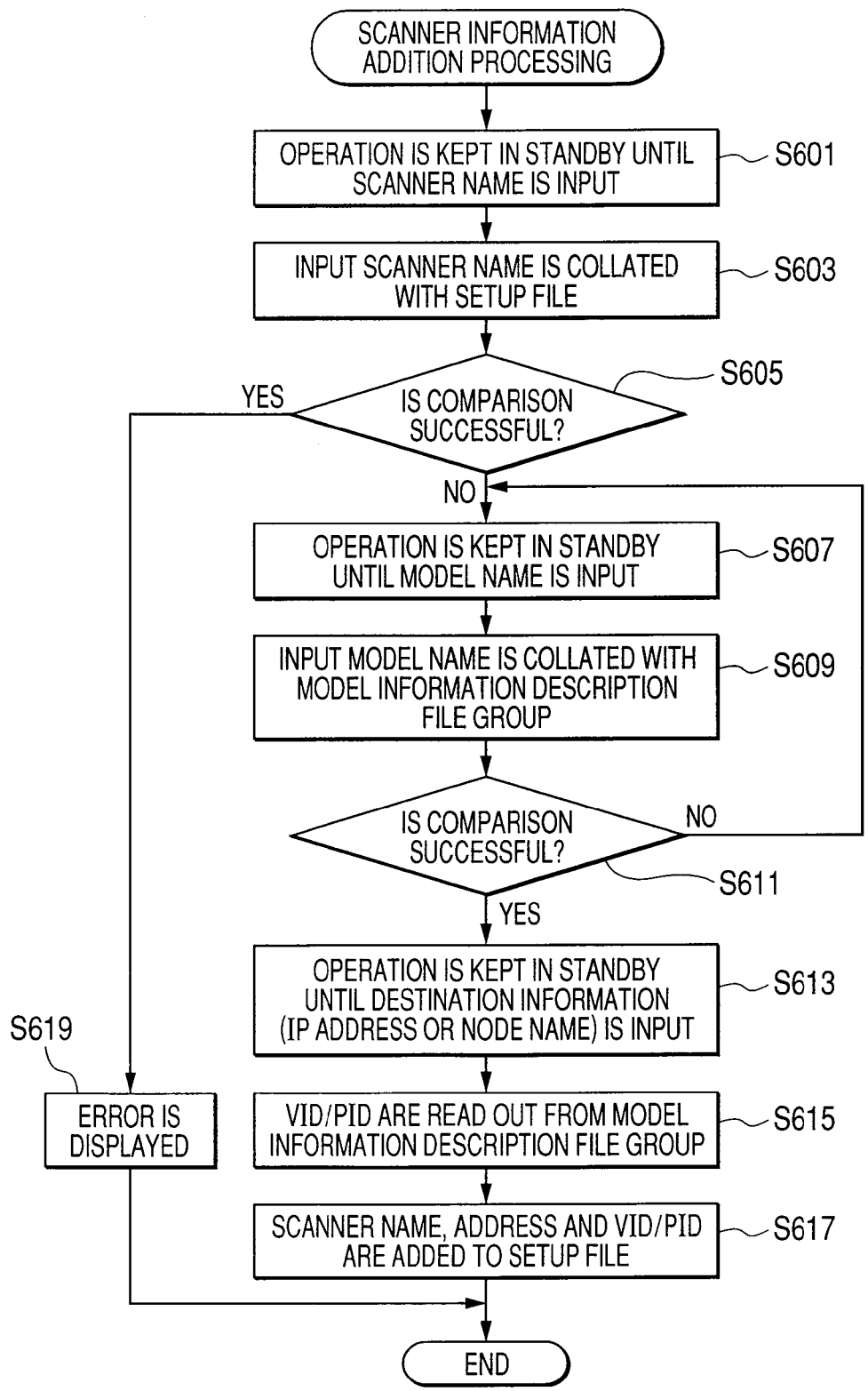
FIG. 11 is a flowchart of scanner information addition processing.

After completion of the processing of S617 or S619, the scanner information addition processing shown in FIG. 11 is to be completed. In this case, the processing of S503 shown in FIG. 10 is to be completed, and as a result, the tool processing shown in FIG. 10 is to be completed as a whole.

On the contrary, when it is judged at the processing of S501 that the instructions are not given for adding scanner information (S501: NO), the setting tool 74 judges on the basis of parameters designated in a command line whether a user has instructed to change the scanner information (S505).

When it is judged at the processing of S505 that the instructions are given for changing the scanner information (S505: YES), scanner information changing processing is executed (S507). The scanner information changing processing is processing that is shown in detail in FIG. 12.

When the scanner information changing processing is started, the setting tool 74 is kept in standby until a scanner name is input (S701). The thus input scanner name is a name which is input at the above processing of S601 and has already been registered at the processing of S617. After the scanner name is input, the setting tool 74 collates the thus input scanner name with the scanner name which has already been registered in the setup file 84 (S703).

As a result of the processing of S703, when the comparison has succeeded (S705: YES), an input scanner name is to be registered in the setup file 84. Thus, in this case, the setting tool 74 is kept in standby until destination information (IP address or node name) is input (S707). Then, after the destination information is input, an address term of the setup file 84 in corresponding scanner information is changed (S709). At the processing of S709, the corresponding scanner information is scanner information including the scanner name input at the processing of S701, and an IP address or a node name before the change is stored in the address term included therein. At the processing of S709, information stored in the address term is rewritten into destination information input at the processing of S707.

Furthermore, as a result of the processing of S703, when the comparison has failed (S705: NO), it means that the thus input scanner name is not registered in the setup file 84. Since information to be changed is not available, an error is displayed (S711).

Figure 12:
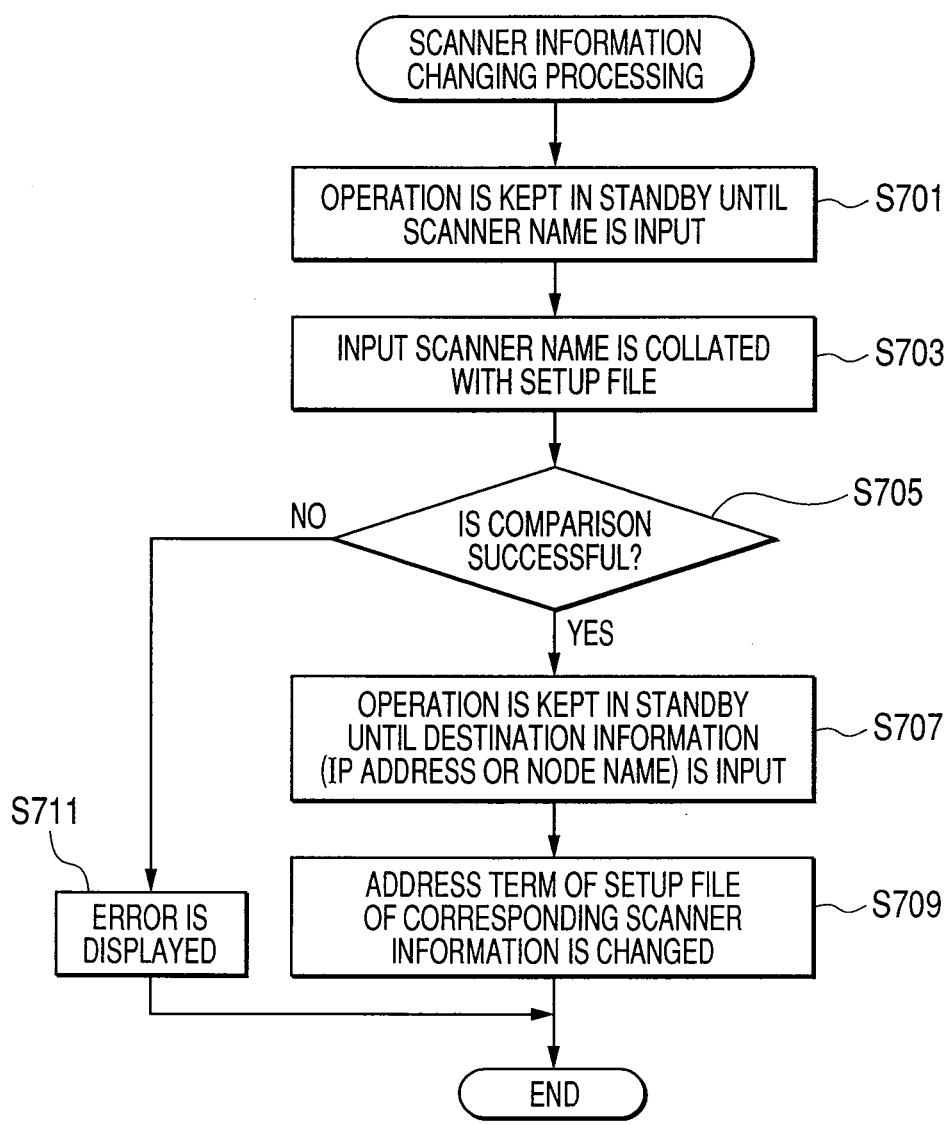
FIG. 12 is a flowchart of scanner information changing processing.

Thus, after completion of the processing of S709 or S711, the scanner information changing processing shown in FIG. 12 is to be completed. In this case, the processing of S507 shown in FIG. 10 is to be completed, and as a result, the tool processing shown in FIG. 10 is to be completed as a whole.

On the contrary, when it is judged at the processing of S505 that the instructions are not given for changing scanner information (S505: NO), the setting tool 74 judges on the basis of parameters designated in a command line whether a user has instructed to delete the scanner information (S509).

When it is judged at the processing of S509 that the instructions are given for deleting the scanner information (S509: YES), scanner information deleting processing is executed (S511). The scanner information deleting processing is processing that is shown in detail in FIG. 13.

When the scanner information deleting processing is started, the setting tool 74 is kept in standby until a scanner name is input (S801). The thus input scanner name is a name which is input at the above processing of S601 and has already been registered at the processing of S617. After the scanner name is input, the setting tool 74 collates the thus input scanner name with the scanner name which has already been registered in the setup file 84 (S803).

As a result of the processing of S803, when the comparison has succeeded (S805: YES), the thus input scanner name is registered in the setup file 84. In this case, the setting tool 74 deletes corresponding scanner information from the setup file 84 (S807). At the processing of S807, the corresponding scanner information is scanner information including a scanner name input at the processing of S801.

Furthermore, as a result of the processing of S803, when the comparison has failed (S805: NO), it means that the thus input scanner name is not registered in the setup file 84. Since information to be deleted is not available, an error is displayed (S809).

Figure 13:
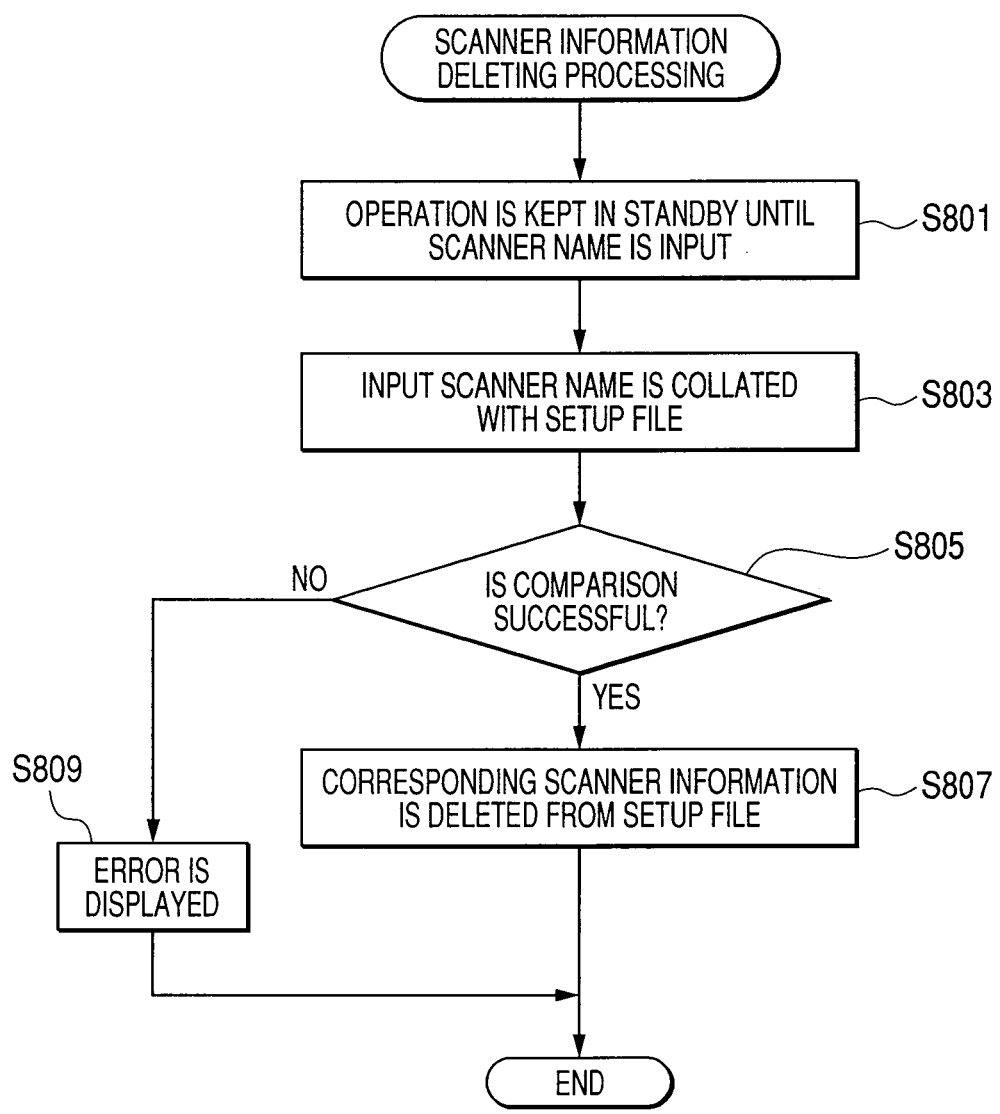
FIG. 13 is a flowchart of scanner information deleting processing.

Therefore, after completion of the processing of S807 or S809, the scanner information changing processing shown in FIG. 13 is to be completed. In this case, the processing of S511 shown in FIG. 10 is to be completed, and as a result, the tool processing shown in FIG. 10 is to be completed as a whole.

On the contrary, when it is judged at the processing of S509 that the instructions are not given for deleting the scanner information (S509: NO), the setting tool 74 judges on the basis of parameters designated in a command line whether a user has instructed to make diagnosis (S513).

When it is judged at the processing of S513 that the instructions are given for making diagnosis (S513: YES), the setting tool 74 takes out scanner information on one unit from the setup file 84 (S515). Then, when processing is not yet completed for all scanners (S517: NO), an answer request is sent to a network scanner indicated by the scanner information taken out at the processing of S515 and the scanner is kept in standby for 10 seconds until an answer returns to the request (S519).

Specifically, in the present aspect, a processing of transmitting an internet control message protocol (ICMP) echo packet (Ping) is carried out at the processing of S519, with a time-out value of 10 seconds. When the ICMP echo packet is normally received, a scanner which is a destination of packet transmission at the processing of S519 returns an ICMP echo reply packet. Thus, the packet can be received on the PC 1 side. On the contrary, when the packet does not arrive at the scanner for some reason (for example, network problems, power failure of the scanner and the like), the ICMP echo reply packet is not returned. Therefore, the timeout develops 10 seconds after the packet transmission on the PC 1 side. Thus, after the packet transmission, a judgment is made for whether the reply packet is received or the timeout is found, based on which diagnosis can be made for whether data can be normally sent to or received from the scanner to which packet is sent.

After completion of the processing of S519, the operation returns to the processing of S515, by which the processing of S515 to S519 is repeated until all scanners registered in the setup file 84 are completely processed. Then, diagnosis is made for whether any answer is given to all scanners. Furthermore, after all scanners are completely processed as a result of the repeated processing (S517: YES), the tool processing shown in FIG. 10 is completed as a whole. It is acceptable to record the result of processing of S519 in a log file (not shown).

On the contrary, when it is judged at the processing of S513 that the instructions are not given for diagnosis (S509: NO), the setting tool 74 judges on the basis of parameters designated in a command line whether a user has instructed to display information (S521).

When it is judged at the processing of S521 that the instructions are given for displaying the information (S521: YES), the setting tool 74 displays the content of the model description file group (model description file 82 and extended model description files 83A and 83B) (S523). Then, it further displays the content of the setup file 84 (S525) and completes the tool processing shown in FIG. 10 as a whole.

When it is judged at the processing of S521 that the instructions are not given for displaying the information (S521: NO), other processing is to be executed. However, the processing is not related to major parts of the present invention and detailed description will be omitted.

According to the above, according to the setting tool 74, a user only carries out each processing of S601, S607 and S613 to input a model name of a scanner, a node name or an IP address of the scanner and a scanner name given arbitrarily by the user, thereby making it possible to read out VID/PID from a model information description file group (model description file 82 and extended model description files 83A and 83B) through the processing of S615 and also add the scanner name, the address and the VID/PID to a setup file 84 through the processing of S617.

Therefore, the setting tool 74 can be used to register the scanner information on a network scanner in the setup file 84 even when a user is not aware of a specific content of the scanner information (information including the VID/PID) necessary for identifying the network scanner.

Furthermore, since information is taken out from the model information description file group including an extended model information description file, a corresponding model can be added only by adding the extended model information description file. Specifically, the extended model information description file can extend not only a scanner driver model but also a setting tool 74 model. In other words, the scanner driver model is extended, by which the setting tool 74 model can be extended automatically without any additional operation by a user.

Furthermore, in the above setting tool 74, a model name input is collated with the model information description file group through the processing of S607 to S611, thereby making it possible not to receive a model name which does not correspond to the scanner driver unit 73A, if the model name is input. Therefore, for example, even if a model name not controllable at the scanner driver unit 73A and an improper model name are input, such model names can be successfully prevented from being registered in the setup file 84.

Description has been made for aspects of the present invention. However, the present invention is not restricted to one specific aspect described above but can be realized in other various modes.

In an above aspect, for example, VID/PID are used as information necessary for identifying a scanner model. In an environment which assures that the VID/PID indicate scanners supplied from certain manufacturers, only the PID may be used to identify a scanner model.

Furthermore, in an above aspect, such a case is shown that the multifunction device 3 having both USB I/F 18 and LAN I/F 19 is used as a USB scanner and also as a network scanner. However, a scanner-based device which is used as a USB scanner is not necessarily provided with LAN I/F 19. Still furthermore, the scanner-based device which is used as a network scanner is not necessarily provided with the USB I/F 18. When a network scanner is not provided with the USB I/F 18, it may not have VID or PID which is to be used by USB. However, in this case as well, if information equivalent to the VID/PID necessary for identifying a scanner model at the scanner driver unit 73A side is stored in the setup file 84, a scanner-based device having no VID/PID can be handled similarly as a scanner-based device capable of obtaining the VID/PID.

Furthermore, in an above aspect, the system main unit 72 is constructed with programs provided for composing SANE on an information processor in which an OS based on UNIX® is used as a platform. If a system main unit is available which has the same function as the SANE, the scanner control system of the present invention is allowed to function on an information processor in which an OS based on software other than UNIX® is used as a platform.

Still furthermore, an above-described aspect is configured in such a way that at the processing of S607 and S609, a model name is input by a user and collated with the contents of the model information description file and the extended model information description files. It may also be configured in such a way that a list of corresponding models is prepared in advance on the basis of the contents of the model information description file and the extended model information description files and the contents are displayed in a pull-down menu etc., from which a user can select a model name.

[FIG. 1]
16: Operation unit
17: Display unit
3: Multifunction device
34: Non-volatile RAM
36: Operation unit
37: Display unit
41: Printer unit
42: Reading unit
43: Modem
[FIG. 2]
71B: Application unit
71A: Application unit
72: System main unit
72A: Frontend unit
73B: Scanner driver unit (backend unit)
73A: Scanner driver unit (backend unit)
81: Model description file storage directory
82: Model description file
83A: Extended model description file
83B: Extended model description file
84: Setup file
74: Setting tool
3: Multifunction device
[FIG. 4]
S101: Preparation of model description data array
S103: Preparation of scanner data information array
S105: Memory block for preparing the list is allocated (number of scanners×byte number of data structures)
S107: Information on effective scanners is read out from scanner data information array and written into memory block.
S109: List prepared on memory block returns to system main unit.
[FIG. 5]
S201: Model description file storage directory is searched.
S203: Is file available?
S205: Information on all scanners in extended model description file is stored in model description data array.
S207: Information on all scanners in model description file is stored in model description data array.
[FIG. 6]
S301: USB device on bus is searched.
S303: Is scanner available?
S305: Data of the scanner concerned is collated with data of model description file group.
S307: Is comparison successful?
S309: Data of collated model description file group is written into scanner data information array.
S311: Network scanner information is read out one line at a time from setup file.
S313: Is scanner available?
S315: Data of the scanner concerned is collated with data of model description file group.
S317: Is comparison successful?
S319: Data of collated model description file group is written into scanner data information array.
[FIG. 9]
S401: Scanner is identified from information specified by system main unit.
S403: Corresponding data (including VID/PID) is taken out from scanner data information array.
S405: Destination information corresponding to VID/PID (such as address), command information and decode information of received data are read.
S407: Network/USB?
S409: Command is sent to USB corresponding bus on the basis of command information read as described above (command information corresponding to VID/PID).
S413: Command is sent to corresponding address/corresponding port of network on the basis of command information read as described above (command information corresponding to VID/PID).
S411: Data is received from USB corresponding bus.
S415: Data is received from corresponding address/corresponding port of network.
S417: Received data is encoded (data processing) on the basis of encode information read as described above (encode information corresponding to VID/PID).
[FIG. 10]
S501: Is ordered to add scanner information?
S505: Is ordered to change scanner information?
S509: Is ordered to delete scanner information?
S513: Is diagnosis made?
S521: Is ordered to display information?
S511: Scanner information deleting processing
S507: Scanner information changing processing
S503: Scanner information addition processing
S523: Content of model description file group is displayed.
S515: Scanner information is taken out from setup file.
S525: Content of setup file is displayed.
S517: Is information on all scanners completed?
S519: Answer request is sent/answer is waited for 10 seconds.
[FIG. 11]
S601: Operation is kept in standby until scanner name is input.
S603: Input scanner name is collated with setup file.
S605: Is comparison successful?
S607: Operation is kept in standby until model name is input.
S609: Input model name is collated with model information description file group.
S611: Is comparison successful?
S613: Operation is kept in standby until destination information (IP address or node name) is input.
S615: VID/PID are read out from model information description file group.
S617: Scanner name, address and VID/PID are added to setup file.
S619: Error is displayed.
[FIG. 12]
S701: Operation is kept in standby until scanner name is input.
S703: Input scanner name is collated with setup file.
S705: Is comparison successful?
S707: Operation is kept in standby until destination information (IP address or node name) is input.
S709: Address term of setup file of corresponding scanner information is changed.

S711: Error is displayed.
[FIG. 13]
S801: Operation is kept in standby until scanner name is input.
S803: Input scanner name is collated with setup file.
S805: Is comparison successful?
S807: Corresponding scanner information is deleted from setup file.
S809: Error is displayed.

What is claimed is:

1. A scanner control system comprising:
   a first communication interface which is configured to communicate with at least one scanner contained in a first device group;
   a second communication interface which is configured to communicate with at least one scanner contained in a second device group, the second communication interface being different in specifications from the first communication interface;
   a storage device which is configured to store a setup file including scanner information on the at least one scanner contained in the second device group and store a model description file including a model name and scanner information while being associated with each other;
   an operation unit which is configured to allow a user to input a model name of an additional scanner contained in the second group;
   a setting unit which is configured to obtain scanner information associated with the model name input by the operation unit from the model description file, and store the obtained scanner information in the setup file, the setting unit being local to the storage device;
   an application unit;
   a scanner driver unit which is configured to control a scanner contained in either the first device group and the second device group, and which is configured to receive image data transmitted from the scanner, the scanner driver unit including:
      a first scanner-information obtaining unit which is configured to communicate with at least one scanner contained in the first device group via the first communication interface, thereby obtaining scanner information on the at least one scanner contained in the first device group;
      a second scanner-information obtaining unit which is configured to obtain the scanner information regarding the at least one scanner connected via the second communication interface whose scanner information is stored in the setup file of the storage device;
      a list providing unit which is configured to provide a list of scanners based on the scanner information which is obtained by the first scanner-information obtaining unit and the second scanner-information obtaining unit;
      a target scanner information obtaining unit which is configured if one of the scanners from the list is selected as a target scanner and target scanner information which indicates the target scanner is provided from a system main unit, to obtain the target scanner information;
      a judgment unit which is configured to judge which one of the first device group and the second device group the target scanner is contained in, on the basis of the target scanner information;
      a scanner control unit which is configured to control the target scanner by utilizing either the first communication interface or the second communication interface, according to a judgment result by the judgment unit;
      an image data receiving unit which is configured to receive image data transmitted from the target scanner; and
      an image data providing unit which is configured to provide image data received by the image data receiving unit,
   wherein the system main unit transmits an instruction from the application unit to the scanner driver unit, the system main unit receives the list provided by the list providing unit and the image data provided by the image data providing unit, and transmits at least one of the list and the image data to the application unit.

2. A scanner control system according to claim 1, wherein the list providing unit provides the system main unit with the list including a scanner name which is arbitrarily given by a user to an individual scanner.

3. A scanner control system according to claim 1, wherein the list providing unit provides the list including a model name of a scanner to the system main unit.

4. A scanner control system according to claim 1, wherein the scanner control unit transmits a command corresponding to model information included in the scanner information to the target scanner, thereby controlling the target scanner.

5. A scanner control system according to claim 1, further comprising:
   a data format conversion unit which is configured to convert image data received by the image data receiving unit from a data format dependent on a model of the target scanner to a data format suitable for specifications of the system main unit in accordance with model information included in the scanner information.

6. A scanner control system according to claim 1, further comprising:
   a corresponding-model information obtaining unit which is configured to obtain from the storage device corresponding-model information which covers models of scanners controllable by the scanner driver unit and extended corresponding-model information stored in the storage device, wherein:
   the storage device is configured to store the corresponding-model information and is capable of storing extended corresponding-model information which indicates a scanner model controllable by the scanner driver unit and not stored as the corresponding model information and also information which can be added or deleted independently of the corresponding-model information; and
   the first scanner information obtaining unit is configured to obtain the scanner information which is information of the model included in the corresponding model information in which model information included in the scanner information is stored as either the corresponding-model information or the extended corresponding-model information.

7. A scanner control system according to claim 6, wherein the corresponding-model information and the extended corresponding-model information are respectively configured as a file.

8. A scanner control system according to claim 1,
   wherein the first communication interface is a USB interface, and
   wherein the second communication interface is a network interface.

9. A scanner control system according to claim 1, wherein the scanner information is obtainable from the at least one scanner contained in the first device group via the first communication interface but unobtainable from the at least one scanner contained in the second device group via the second communication interface.

10. A non-transitory computer-readable medium storing computer-executable instructions that, when executed, enable a computer to have a function of a scanner driver, the computer configured to perform predetermined operations, the computer including:
a first communication interface which is configured to communicate with at lease once scanner contained in a first device group including a scanner;
a second communication interface which is configured to communicate with at least one scanner contained in a second device group including at least one scanner, the second communication interface being different in specifications from the first communication interface;
a storage device which is configured to store a setup file including scanner information on the at least one scanner contained in the second device group and store a model description file including a model name and scanner information while being associated with each other;
an operation unit which is configured to allow a user to input a model name of an additional scanner contained in the second device group;
a setting unit which is configured to obtain scanner information associated with the model name input by the operation unit from the model description file, and store the obtained scanner information in the setup file, the setting unit being local to the storage device;
an application unit;
a scanner driver unit; and
a system main unit which is configured to transmit an instruction from the application unit to the scanner driver unit, the system main unit receiving data from the scanner driver unit, and transmitting the data to the application unit; and
the predetermined operations comprising:
obtaining scanner information on a scanner contained in the first device group by communicating with the first device group via the first communication interface;
obtaining the scanner information stored in the setup file of the storage device regarding the at least one scanner connected via the second communication interface;
providing a list of scanners based on the scanner information which is obtained from the first device group and the scanner information stored in the setup file of the storage device;
obtaining target scanner information when one of the scanners from the list is selected as a target scanner and target scanner information which indicates the target scanner is provided from a system main unit, to obtain the target scanner information;
judging which one of the first device group of the second device group the target scanner is contained in on the basis of the target scanner information;
controlling the target scanner by utilizing either the first communication interface or the second communication interface, according to a judgment result;
receiving image data sent from the target scanner; and
providing image data received by the receiving of the image data unit to the system main unit.

11. A scanner control system comprising:
a first communication interface which is configured to communicate with at least one scanner contained in a first device group;
a second communication interface which is configured to communicate with at least one scanner contained in a second device group, the second communication interface being different in specifications from the first communication interface;
a storage device which is configured to store a setup file including scanner information on the at least one scanner contained in the second device group and store a model description file including a model name and scanner information while being associated with each other;
an operation unit which is configured to allow a user to input a model name of an additional scanner contained in the second device group;
a setting unit which is configured to obtain scanner information associated with the model name input by the operation unit from the model description file, and store the obtained scanner information in the setup file, the setting unit being local to the storage device;
an application unit;
a scanner driver unit which is configured to control a scanner contained in either the first device group and the second device group, and which is configured to receive image data transmitted from the scanner, the scanner driver unit including:
a first scanner-information obtaining unit which is configured to communicate with the at least one scanner contained in the first device group via the first communication interface, thereby obtaining scanner information on the at least one scanner contained in the first device group;
a second scanner-information obtaining unit which is configured to read out a scanner information stored in the setup file of the storage device to obtain the scanner information regarding the at least one scanner connected via the second communication interface, wherein the scanner information is stored in the storage device in the same format as the information obtained by the first scanner-information obtaining unit;
a function information providing unit which is configured to provide function information corresponding to the scanner information obtained by the first scanner-information obtaining unit or the second scanner-information obtaining unit;
an operational parameter information obtaining unit which is configured, if an operation condition of a target scanner is set and operation parameter information which indicates the operation condition is provided from a system main unit, to obtain the operation parameter information;
a scanner control unit which is configured to transmit a command corresponding to the operational parameter obtained by the operational parameter information obtaining unit by using at least one of the first communication interface and the second communication interface, thereby controlling the target scanner;
an image data receiving unit which receives image data transmitted from the target scanner; and
an image data providing unit which provides image data received by the image data receiving unit,
wherein the system main unit transmits an instruction from the application unit to the scanner driver unit, the system main unit receives and the image data provided by the image data providing unit, and transmits at least one of the list and the image data to the application unit, and the system main unit transmits the operation parameter information to the scanner driver unit.

12. A non-transitory computer-readable medium storing computer-executable instructions that, when executed, enable a computer to perform predetermined operations the computer including:
   a first communication interface which is configured to communicate with at least one scanner contained in a first device group including a scanner;
   a second communication interface which is configured to communicate with at least one scanner contained in a second device group including at least one scanner, the second communication interface being different in specifications from the first communication interface;
   a storage device which is configured to store the setup file of scanner information on the at least one scanner contained in the second device group and store a model description file including a model name and scanner information while being associated with each other;
   an operation unit which is configured to allow a user to input a model name of an additional scanner contained in the second device group;
   a setting unit which is configured to obtain scanner information associated with the model name input by the operation unit from the model description file, and store the obtained scanner information in the setup file, the setting unit being local to the storage device;
   an application unit;
   a scanner driver unit; and
   a system main unit which is configured to transmit an instruction from the application unit to the scanner driver unit, the system main unit configured to receive data from the scanner driver unit, and transmit the data to the application unit; and
   the predetermined operations comprising:
      obtaining scanner information on the at least one scanner contained in the first device group by communicating with the first device group via the first communication interface;
      reading out a scanner information from the setup file of the storage device for the at least one scanner connected via the second communication interface, the scanner information in the storage device being stored in the same format as the information obtained via the first communication interface;
      providing function information corresponding to the scanner information obtained by one of the obtaining of the scanner information via the first communication interface and the obtaining the scanner information stored in the second device;
      obtaining operational parameter information if an operation condition of a target scanner is set and operation parameter information which indicates the operation condition is provided from a system main unit, to obtain the operation parameter information;
      transmitting a command corresponding to the operational parameter obtained by using at least one of the first communication interface and the second communication interface, thereby controlling the target scanner; receiving image data sent from the target scanner; and
      providing image data received to the system main unit.

13. A scanner control system comprising:
   a first communication interface which is configured to communicate with at least one scanner contained in a first device group;
   a second communication interface which is configured to communicate with at least one scanner contained in a second device group, the second communication interface being different in specifications from the first communication interface;
   a storage device which is configured to store a setup file including scanner information on the at least one scanner contained in the second device group and store a model description file including a model name and scanner information while being associated with each other;
   an operation unit which is configured to allow a user to input a model name of an additional scanner contained in the second device group;
   a setting unit which is configured to obtain scanner information associated with the model name input by the operation unit from the model description file, and store the obtained scanner information in the setup file, the setting unit being local to the storage device;
   an application unit;
   a scanner driver unit which is configured to control a scanner contained in either the first device group and the second device group, and which is configured to receive image data transmitted from the scanner, the scanner driver unit configured to:
   determine whether the scanner is connected via the first interface or the second interface,
   based on a determination that the scanner is attached to the first interface, obtain scanner information from the scanner via the first interface and, based on a determination that the scanner is attached to the second interface, obtain scanner information from the setup file of the storage device, and
   control the scanner based on the obtained scanner information.

* * * * *

UNITED STATES PATENT AND TRADEMARK OFFICE
CERTIFICATE OF CORRECTION

PATENT NO. : 8,427,669 B2
APPLICATION NO. : 11/685430
DATED : April 23, 2013
INVENTOR(S) : Masatoshi Kadota Page 1 of 1

It is certified that error appears in the above-identified patent and that said Letters Patent is hereby corrected as shown below:

On the title page, item 57, In the Abstract:
Please delete "unit to-the to a" and insert --unit to a--

In the Claims

In Column 23, Claim 1, Line 28:
Please delete "second group;" and insert --second device group;--

Signed and Sealed this
Twenty-sixth Day of August, 2014

Michelle K. Lee
*Deputy Director of the United States Patent and Trademark Office*